US011789933B2

(12) United States Patent
Hunn et al.

(10) Patent No.: US 11,789,933 B2
(45) Date of Patent: Oct. 17, 2023

(54) SYSTEM AND METHOD FOR A HYBRID CONTRACT EXECUTION ENVIRONMENT

(71) Applicant: DocuSign, Inc., San Francisco, CA (US)

(72) Inventors: Peter Geoffrey Lerato Hunn, Irving, TX (US); Daniel Charles Selman, Winchester (GB); Jerome Simeon, New York, NY (US); Matthew Roberts, South Moreton (GB)

(73) Assignee: DOCUSIGN, INC., San Francisco, CA (US)

( * ) Notice: Subject to any disclaimer, the term of this patent is extended or adjusted under 35 U.S.C. 154(b) by 327 days.

(21) Appl. No.: 16/563,626

(22) Filed: Sep. 6, 2019

(65) Prior Publication Data

US 2020/0104296 A1    Apr. 2, 2020

Related U.S. Application Data

(60) Provisional application No. 62/727,868, filed on Sep. 6, 2018.

(51) Int. Cl.
*G06F 16/23* (2019.01)
*G06F 16/27* (2019.01)
*H04L 9/00* (2022.01)

(52) U.S. Cl.
CPC .......... *G06F 16/2379* (2019.01); *G06F 16/27* (2019.01); *H04L 9/50* (2022.05)

(58) Field of Classification Search
CPC ... H04L 2209/38; G06F 16/27; G06F 16/2379
USPC ........................................................ 707/703
See application file for complete search history.

(56) References Cited

U.S. PATENT DOCUMENTS

| | | |
|---|---|---|
| 5,892,900 A | 4/1999 | Ginter et al. |
| 6,640,304 B2 | 10/2003 | Ginter et al. |
| 7,433,838 B2 | 10/2008 | Welsh et al. |
| 7,756,772 B1 | 7/2010 | Konopnicki et al. |

(Continued)

OTHER PUBLICATIONS

Ron White, How Computers Work, 15 Oct. 15, 2003, Que Publishing, 7th Ed, p. 4 (Year: 2003).

(Continued)

*Primary Examiner* — Hosain T Alam
*Assistant Examiner* — Nicholas E Allen
(74) *Attorney, Agent, or Firm* — Shumaker & Sieffert, P.A.

(57) ABSTRACT

A system and method for managing an electronic contract for hybrid runtime execution, which includes a contract execution service that comprises an internal runtime environment and a set of integrations to external resources with at least one integration to an on-chain runtime, wherein the contract execution service comprises configuration to: establish the electronic contract, wherein the electronic contract comprises a set of executable programmable components and a set of natural language components; change the state of the electronic contract and generate a contract event; and in response to the contract event: extend execution of the electronic contract to an on-chain environment, when the contract event includes an associated on-chain integration; and extend execution of the electronic contract to an external application resource, when the contract event includes an associated external service integration.

21 Claims, 42 Drawing Sheets

(56) References Cited

U.S. PATENT DOCUMENTS

| | | | |
|---|---|---|---|
| 7,831,573 | B2 | 11/2010 | Lillibridge et al. |
| 8,086,866 | B2 | 12/2011 | Jakobsson |
| 8,285,681 | B2 | 10/2012 | Prahlad et al. |
| 9,356,965 | B2 | 5/2016 | Kjeldaas |
| 9,432,192 | B1 | 8/2016 | Pogde et al. |
| 9,483,455 | B1 | 11/2016 | Bastide et al. |
| 11,055,479 | B2* | 7/2021 | Gazit .................... G06F 40/169 |
| 2002/0091539 | A1 | 7/2002 | Yin et al. |
| 2002/0184504 | A1 | 12/2002 | Hughes |
| 2007/0250337 | A1 | 10/2007 | Karamchedu et al. |
| 2009/0234662 | A1 | 9/2009 | Stieber et al. |
| 2010/0268528 | A1 | 10/2010 | Raskina et al. |
| 2011/0307278 | A1 | 12/2011 | Clarke et al. |
| 2012/0303969 | A1 | 11/2012 | Jakobsson |
| 2014/0164255 | A1 | 6/2014 | Daly et al. |
| 2015/0379510 | A1 | 12/2015 | Smith |
| 2016/0028552 | A1 | 1/2016 | Spanos et al. |
| 2016/0034519 | A1 | 2/2016 | Besch et al. |
| 2016/0110261 | A1 | 4/2016 | Parab et al. |
| 2016/0117471 | A1 | 4/2016 | Belt et al. |
| 2016/0283941 | A1 | 9/2016 | Andrade |
| 2017/0103167 | A1 | 4/2017 | Shah |
| 2017/0103468 | A1 | 4/2017 | Orsini et al. |
| 2017/0236120 | A1 | 8/2017 | Herlihy et al. |
| 2017/0287090 | A1* | 10/2017 | Hunn .................... H04L 9/0643 |
| 2017/0331896 | A1 | 11/2017 | Holloway et al. |
| 2018/0005186 | A1* | 1/2018 | Hunn .................... G06F 40/103 |
| 2018/0143995 | A1* | 5/2018 | Bailey .................... G06F 21/64 |
| 2018/0174255 | A1 | 6/2018 | Hunn et al. |
| 2018/0315141 | A1 | 11/2018 | Hunn et al. |
| 2018/0365201 | A1* | 12/2018 | Hunn .................... G06Q 50/18 |
| 2019/0080392 | A1 | 3/2019 | Youb et al. |
| 2019/0122317 | A1 | 4/2019 | Hunn et al. |
| 2019/0139037 | A1* | 5/2019 | Khalil ................. G06Q 20/027 |
| 2019/0158275 | A1* | 5/2019 | Beck .................... G06F 16/2379 |
| 2019/0188399 | A1* | 6/2019 | Palaniappan ....... G06F 21/6209 |
| 2019/0236598 | A1* | 8/2019 | Padmanabhan .... G06Q 20/0655 |
| 2019/0251078 | A1* | 8/2019 | Yan ....................... H04L 9/3239 |
| 2019/0358515 | A1 | 11/2019 | Tran et al. |
| 2020/0057994 | A1 | 2/2020 | Hunn |
| 2020/0104296 | A1* | 4/2020 | Hunn ................. G06F 16/2379 |

OTHER PUBLICATIONS

Grigg, I., "The Ricardian Contract", Proceedings. First IEEE International Workshop on Electronic Contracting, 2004.

U.S. Appl. No. 16/563,626, filed Sep. 6, 2019, Peter Geoffrey Lerato Hunn.

International Preliminary Report on Patentability from International Application No. PCT/US2019/050075 dated Dec. 4, 2019, 6 pp.

International Search Report and Written Opinion of International Application No. PCT/US2019/050075 dated Dec. 4, 2019, 7 pp.

* cited by examiner

```
"target": "io.clause.outbound.physical.payments.crypto.ethereum.EthereumTransfer",
"transform":
"{\"class\":\"io.clause.outbound.physical.payments.crypto.ethereum.EthereumTransfer\",
\"fromAccount\":config.fromAccount, \"toAccount\":config.toAccount,
\"welValue\":response_amount, \"priateKey\": config.privateKey }",
"config": {
        "fromAccount": "0xd6a33a691c19169a9e8121d12cfc602fa29f3663",
        "toAccount": "0xf8ebf025868f897c1afc1d2ae54444f3e74677a05",
        "privateKey": "0x6afe5c024ae7c41983edc026f89238abc11",
        }
```

FIGURE 7

Review
untitled

Recipients peaterhong peater@example.com
signatory

Peater Hong

Peater+2@example.com
signatory

When you have completed drafting your contract you can initiate the request for digital signatures from the contract signatories by pressing the "Continue" button. Note that once you press "Continue" the contract can no longer be edited.

| Help | | Back | Continue |

Smart Clauses laterdeliveryandpenality

FIGURE 11

Late Delivery and Penality. In Case of delayed delivery except for Force Majeur cases, "Peter" (the Seller), shall pay to "Dan" (the Buyer) for every 2 days of delay penalty amounting to 10.5% of the total value of the Equipment whose delivery has been delayed. Any fractional part of a day is to be considered a full day. The total amount of penalty shall not however, exceed 55% of the total value of the Equipment involved in late delivery. If the delay is more than 15 days, the Buyer is entitled to terminate the Contract.

FIGURE 12

Drafting

Mar 9
12:00 AM
Michael G
Contract Created
"John H. Design Agreement?"

Mar 9
12:00 AM
Michael G
Michael G was added as a signatory
Michael@example.com Mar 9
12:00 AM
Michael G
Dan S. was added as a signatory
dan@example.com Mar 9
12:00 AM
Michael G
Smart Clause added
Michael G. added a fragile-goods
Smart Clause
Details Mar 9
12:00 AM
Smart Clause triggered in test mode
The perishable-goods Smart Clause was
successfully triggered in test mode
Details
T Mar 9
12:00 AM
Michael G
Contract set to signatories
The contract is now awaiting signatures
from
    Michael G.
    Dan S.

Signing

Mar 9
12:00 AM
Dan S. signed the contract
dan@example.com

Mar 9
12:00 AM
Michael G. signed the contract
micheael@example.com

Mar 9
12:00 AM
All signatories signed the contract
The contract is now running

Running

Mar 9
12:00 AM
Smart Clause Triggered
The fragile-goods Smart Clause was triggered
Details The fragile-goods Smart Clause
emitted a payment obligation for $195
Details Mar 9
12:00 AM
Actions completed
These actions were initiated by the
fragile-goods payment obligation at 12:00 AM Payment from the buyer to seller's account
Details Ethereum Transfer
Details

Completed

Mar 9
12:00 AM
All Smart Clauses completed
The contract is now complete

FIGURE 13

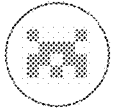
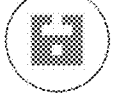
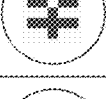
FIGURE 14

```
{
    "$class": "io.clause.outbound.physical.Http",
    "url": "https://XXXXX.ngrok.io/YYYYY",
    "method":"POST",
    "body":{
        "date":response.timestamp,
        "note":"Fragile Goods Update",
        "amount":response.amount.doubleValue
    }
}
```

FIGURE 16

```
{
  "$class":
"io.clause.outbound.physical.payments.stripe.StripeCreateCharge",
    "accessToken": "sk_test_XXXXXXXXXXXXXXXXXXXXXXX",
    "source": "tok_visa",
    "accountId":"acct_XXXXXXXXXXXXX",
    "amount": response.amount
}
```

FIGURE 17

| Home | Smart Contracts | Consensus poa | Block Heigh 474269 |

[ Previous ]  Transaction 0x72fa0233973016...1af45

| | |
|---|---|
| Hash | 0x7238af02ddb933a7630cf9fcd93209eabb3bce...f580 |
| Block | 474260 |
| Time | 2018-09-01 07:58:25 +0000 (43 seconds ago) |
| To | 0xd19dd815a748744c68939d20fdf5a3...e58a |
| Gas Provided | 1000000 |
| Input Data | 0=z<br>0{"contractId":"fdbf4....9201", "organizationId":"5d886...e54f", "userId":"5a89...e645", "timestamp":"2018-09-01 07:58:25 +0000", "data":{\"documentHash\":\"29e3...9385\"}", "$class":"io.clause.common.audit.SaveContract"} |

[ Bytes | ASCII | Copy ]

Clause Blockchain Network

MY NETWORK
- Overview
- Members
- Channels
- Notifications
- Certificate Authority
- APIs

MY CODE
- Developing Code
- Install Code
- Try Samples

Get Help

Block details                                                    X

| Invoke
UUID
| e64eefffb82af12f59af3ae18b50b2c5673f7f2b3f94916b2286
Chaincode ID(s)
| clause
Input
| ["storeAuditEvent","5b9b88a9aad698c199ddcf27","
|{\"contractID\":\"5b9b88a9aed698c199ddcf27\",\"organizationID\":\"5a88689160
|409d0001fea53f\",\"timestamp\":\"2018-0914T10:11:19.8337\",\"$class\":\"io.claus
e.common.audit.ContractLifecycleStatusChanged\",\"oldStatus\":\"DRAFTING\",\"

Output
| WRITE 5b9b88a9aed698c199dddf27-AuditEvent =
|"contractID":"5b9b88a9aed7088a9aed9199ddcf2","organizationID":"5a886891704
d000|1","
|timestamp":"2018-09-14T10:11:19.8332","$class":"io.clause.common.audit.Contra
ctLifecyc|eStatusChanged","oldStatus":"DRAFTING","newStatus":"SIGN

[ Cancel ]

FIGURE 18

```
const smartContract =
`pragma solidity ^0.4.17;

contract auditLog { struct LogEntry {
     address entityAddress;
     string payload;
  }

LogEntry[] public logEntries;

function push(address entityAddress, string payload) public
returns(uint rowNumber) {
     LogEntry memory newLogEntry;
     newLogEntry.entityAddress = entityAddress;
     newLogEntry.payload       = payload;
     return logEntries.push(newLogEntry)-1;
  } function getSize() public constant returns(uint size) {
     return logEntries.length;
  }
}`;
```

FIGURE 19

```
Record #      4

Entity        0xD19DD815a748744C805A232169eb20fdf5a3e58a
address

Payload       {
                "contractId": "5bd80f086ac47d0028519021",
                "organizationId": "5a88689170409d0001fea53f",
                "userId": "5a89399139015f00019ae607",
                "timestamp": "2018-10-30T00:14:25.559Z",
                "data": "{\"documentHash\":\"4478051facde25fe36b4cacbdc773900fbea
                "$class": "io.clause.common.audit.SaveContract"
              }
```

FIGURE 20

```
// @flow
const Web3 = require('web3');
const EventService = require('../EventService');

type Event = { fromAccount: string, contractAddress: string, contractInterface: string,
privateKey: string,  data: {},  rpcUrl?: string,
  gasLimit: number,  gasPrice: number,}
type Web3Options = {  web3: Web3}

/**
 * Execute an arbitrary Ethereum transaction in unattended mode.
 */
class NonInteractiveEthereumTransaction extends EventService {
  constructor() {
    super('io.clause.outbound.physical.dlt.ethereum.NonInteractiveEthereumTransaction');
  } async execute(e: Event) {
    return this.executeWithOptions(e, null);
  }

/**
   * @param {io.clause.outbound.physical.payments.ethereum.NonInteractiveEthereumTransaction'}
e -
     * the ethereum transaction to perform
   */
  async executeWithOptions(e: Event, options: ?Web3Options) {
    const account = e.fromAccount;
    const contractAddress = e.contractAddress;
    const abi = JSON.parse(e.contractInterface);
    const privateKey = e.privateKey;
    const abiData = e.data;
    // defaults to the Rinkeby test net, hosted by Infura
    const rpcUrl = e.rpcUrl ? e.rpcUrl : 'https://rinkeby.infura.io/RohGXTpKuclYPEGHeFu2';

// Optionally could cache for performance
    const web3 = (options && options.web3) ? options.web3 :
      new Web3(new Web3.providers.HttpProvider(rpcUrl));

// how much we are prepared to spend in gas executing a transaction
    let gasLimit = e.gasLimit;
    if (!gasLimit) {
      gasLimit = 200000;
    }
    this.log(`gasLimit: ${gasLimit}`);
    const gasLimitHex = web3.utils.toHex(gasLimit);
...
```

FIGURE 21A

```
    ...
    // get the gas price used by recent blocks
    let gasPrice = e.gasPrice;
    if (!gasPrice) {
      gasPrice = await web3.eth.getGasPrice();
      // inflate by 20% so we can replace failed transactions and get validated quickly
      gasPrice = Math.ceil(gasPrice * 1.2);
    }
    this.log(`gasPrice: ${gasPrice}`);
    const gasPriceHex = web3.utils.toHex(gasPrice);
    this.log(`using account: ${account}`);

// the nonce should be a monotonically increasing number. it is scoped to an account and
allows failed transactions to be retried
    const nonce = await web3.eth.getTransactionCount(account);
    this.log(`nonce: ${nonce}`);

// create a contract instance, using the ABI - this generates dynamic methods
    const contract = new web3.eth.Contract(abi, contractAddress, {
      from: account,
      gasPrice: gasPriceHex,
      gasLimit: gasLimitHex,
    });

// create the deploy smart contract transaction so we can sign it
    const tx = {
      nonce: web3.utils.toHex(nonce),
      // gas : undefined, // calculate the gas required for the tx
      // the higher this is the more likely the tx is to get included in a block
      gasPrice: gasPriceHex,
      // the max amount of gas we are prepared to pay for the computation fo this tx
      gasLimit: gasLimitHex,
      data: abiData, // the RPC data
      from: account, // the account performing the action that will be debited
      to: contract.options.address, // the address of the contract
    };

this.log(`signing transaction: ${JSON.stringify(tx)}`);

// we sign the transaction with the account's private key so we do not have to
    // interactively unlock the account in geth
    const signed = await web3.eth.accounts.signTransaction(tx, privateKey);

// submit the transaction
    const receipt = await web3.eth.sendSignedTransaction(signed.rawTransaction);

// the transaction was validated
    this.log(`transfer completed: ${JSON.stringify(receipt)}`);
    return receipt;
  }
} module.exports = NonInteractiveEthereumTransaction;
```

FIGURE 21B

```
{
  "$class": "io.clause.outbound.physical.dlt.ethereum.NonInteractiveEthereumTransaction",
  "fromAccount": "0xd6a33a691c19169a9e8121d12cfc602fa29f3663",
  "contractAddress": "0xf8ebf925868f897c1afc1d2ae5444f3e74677a05",
  "contractInterface": $string([
    {
      "constant":true,
      "inputs":[{"name":"","type":"address"}],
      "name":"balances",
      "outputs":[{"name":"","type":"uint256"}],
      "payable":false,
      "stateMutability":"view",
      "type":"function"
    },{
      "constant":false,
      "inputs":[{"name":"_to","type":"address"},{"name":"_amount","type":"uint256"}],
      "name":"transfer",
      "outputs":[],
      "payable":false,
      "stateMutability":"nonpayable",
      "type":"function"
    },{
      "inputs":[],
      "payable":false,
      "stateMutability":"nonpayable",
      "type":"constructor"
    }
  ]),
  "data": "0xa9059cbb000000000000000000000000d6a33a691c19169a9e8121d12cfc602fa29f36630000000000000000000000000000000000000000000000000000000000000064",
  "privateKey": "0x6afe5c024ae7c41983edc026f2122e0b24d934b1982b9d9d552fbb224286bfdc"
}
```

FIGURE 22

```
{
    "$class": "io.clause.demo.fragileGoods.PayOut",
    "amount": {
        "$class": "org.accordproject.money.MonetaryAmount",
        "doubleValue": 186.02,
        "currencyCode": "USD"
    },
    "transactionId": "06739290-bf4b-11e8-a73b-ed1e57c6b98c",
    "timestamp": "2018-09-23T16:09:18.649Z"
}
```

FIGURE 30

```
{
    "$class": "io.clause.outbound.physical.alerts.SlackMessage",
    "url":
"https://hooks.slack.com/services/XXXXXXXX/YYYYYYYY/ZZZZZZZZZZZZZZZZZZZZZZZZ",
    "message":"*Fragile Goods Payout*\n" & response.amount.doubleValue & " " &
response.amount.currencyCode
}
```

FIGURE 31

```
{
    "$class": "io.clause.outbound.physical.alerts.slackMessage",
    "url": "WEBHOOK_URL",
    "message": "MY_MESSAGE"
}
```

FIGURE 32

```
{
    "$class": "io.clause.outbound.physical.Http",
    "url": "WEBHOOK_URL",
    "method":"POST",
    "body":{
        "date":response.timestamp,
        "note":"Fragile Goods Update",
        "amount":response.amount.doubleValue
    }
}
```

FIGURE 34

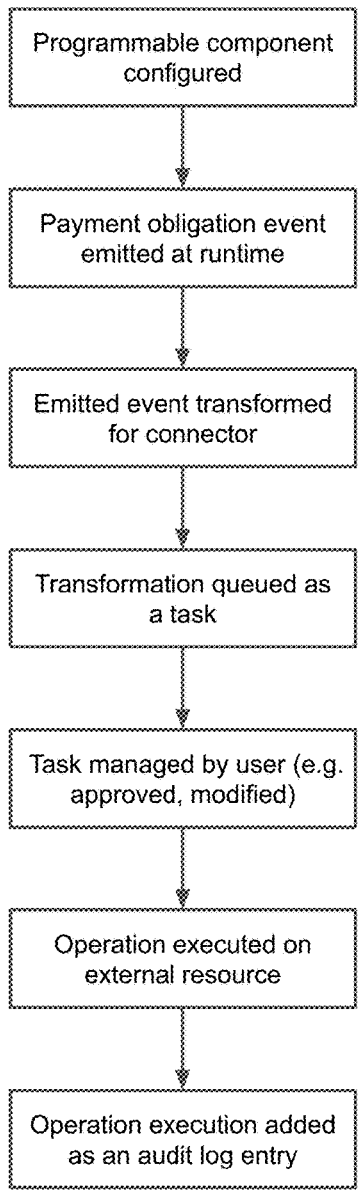 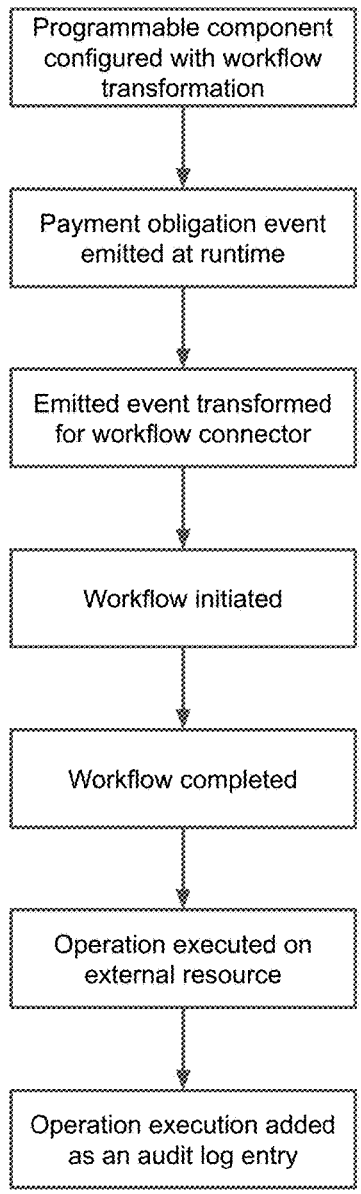 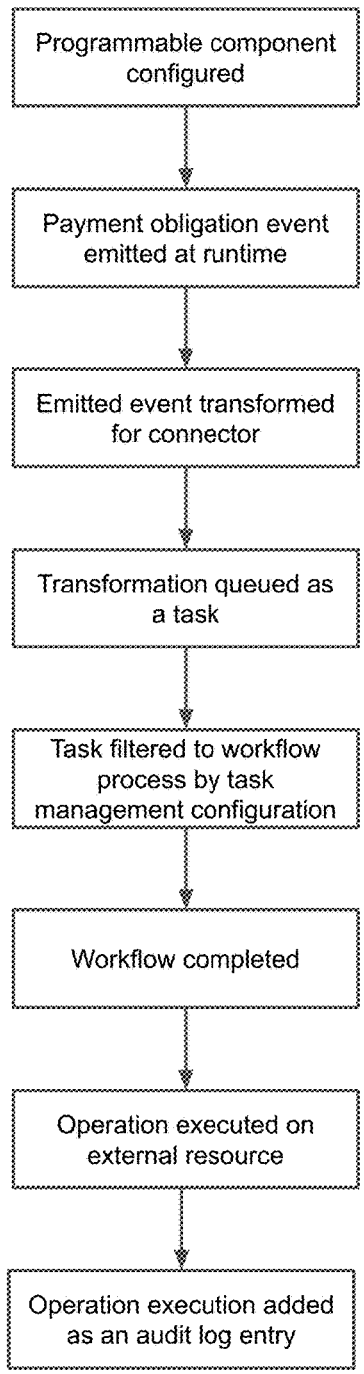
FIGURE 42A
FIGURE 42B
FIGURE 42C

In a contract pre-formation stage:

Establishing an electronic contract S110

Forming a contract S120

Adding a plurality of contract participants S122

Adding at least one set of contract stipulations to the electronic contract S124

In a contract post-formation stage:

Updating the electronic contract S130

Changing the state of the electronic contract S132

Generating a contract event S134

In response to a contract event:

Extending execution to an on-chain environment S140

Initiating a transaction on a blockchain S142

Extending execution to an external application S150

FIGURE 44

SYSTEM AND METHOD FOR A HYBRID CONTRACT EXECUTION ENVIRONMENT

CROSS-REFERENCE TO RELATED APPLICATIONS

This Application claims the benefit of U.S. Provisional Application No. 62/727,868, filed on 6 Sep. 2018, which is incorporated in its entirety by this reference.

TECHNICAL FIELD

This invention relates generally to the field of electronic documents and transaction management, and more specifically to facilitating the formation, versioning, execution, and management of contracts.

BACKGROUND

A contract is a legally enforceable agreement to exchange value such as goods, services, or property. Contracts are a fundamental tool for coordinating economic activity. Four of the basic stages of contracting are: formation, performance, renegotiation and amendment (if applicable), and termination/completion. Written contracts are typically paper-based or computer-based digital representations of paper-based contracts; often filed and stored in PDF format. Contracts are typically composed of numerous distinct clauses that establish basic information and contain the parties' agreed upon rights and obligations. Clauses may be made up of a single sentence or a paragraph, and are grouped together topically, and often hierarchically, by sections. Contracts are typically structured so that clauses make intra-document references to one another, either in the same section or across different sections. Clauses and sections that may appear in modern contracts often include: a preamble, identification of the parties, recitals, definitions, the exchange of value and the parties' other obligations (including actions the parties should and should not undertake), representations, warranties, conditions, and several boilerplate clauses such as choice of law, assignment, and entire agreement (merger) clauses. Contract documents often incorporate by reference other documents, appendices, laws, and standards into the agreement. Under existing technology and practices, the contract serves as a static documentary record of the agreement as of the date of execution. As such, although the external environment that relates to the contract and the parties' conduct pursuant to the contract may change over time, the terms and conditions of the clauses do not change after the contract is formed unless there is a legal amendment/modification. Commercial enterprises will often manage legal contracts using Contract Lifecycle Management (CLM) software.

CLM software typically operates by creating a centralized repository of documents that captures and/or extracts data, often from paper-based documents or PDFs, relevant to the user's obligations under each contract. This static data is stored and tracked to monitor the performance of obligations, manage business milestones, and provide the basis for basic business analytics. CLM software creates a system and layer of software and data separate from the actual contracts the CLM system assists in managing. CLM software cannot provide real-time state or visibility of contracts and contractual performance, and no aspect of CLM software, by itself, has the ability to constitute or amend legally enforceable contract rights, obligations, or parameters, distinct from the underlying contracts that are managed. Management of contracts and associated administrative actions/operations are largely performed manually by users of the CLM software.

Various initiatives are also underway to automate and execute aspects of contract performance, often by using distributed ledger implementations, sometimes referred to as "smart contracts". Distributed ledgers (also known as "shared ledgers", "replicated ledgers" or, in specific implementations, "blockchains"), are a type of database architecture where a single record of data is spread throughout and viewable by numerous entities, and typically updated according to a robust consensus protocol/algorithm. Despite many of these more recent developments, legal contracts are still executed and managed in their static states (with the same terms and conditions as they are initially formed). In addition, despite the use of the term contract, smart contracts are often simply coded scripts (often with state) that execute and perform processes or transactions on a blockchain or distributed ledger and are often divorced from any legally enforceable contract and the contractual rights and obligations of any party. A smart contract may have legal application or legal effects, but may equally not have legal application. Contracts will often benefit from 'smart contract' technologies, but can be limited by capabilities of smart contracts. The term contract in the foregoing sense may therefore be somewhat of a misnomer. Furthermore, many smart contract systems suffer from significant technical drawbacks that may limit their enterprise and legal suitability, including issues pertaining to scalability, privacy, security, architecture, and consensus management.

Thus, there is a need in the electronic document and transaction management fields to create a new and useful system and method for facilitating the formation, versioning, execution, and management of computable legal contracts. Additionally, there is a need to improve existing smart contract systems for enterprise and/or legal application. This invention provides such a new and useful system and method.

BRIEF DESCRIPTION OF THE FIGURES

The present invention is illustrated by way of example, and not by way of limitation, in the figures of the accompanying drawings in which:

FIG. 7 is a depiction of an exemplary on-chain asset transfer configuration executed from a programmable clause within a contract by integration with a BDL system;

FIG. 11 depicts an exemplary signature workflow from a contract management system (CMS);

FIG. 12 depicts an exemplary natural language component of a signable document;

FIG. 13 depicts an exemplary representation of a contract log shown on a contract management service;

FIG. 14 depicts an exemplary user interface for a contract log;

FIG. 16 depicts an exemplary transformation via an HTTP request;

FIG. 17 depicts an exemplary transformation via an HTTP request;

FIG. 18 depicts an exemplary set of transaction data;

FIG. 19 depicts an exemplary set of transaction data;

FIG. 20 depicts an exemplary set of transaction data;

FIGS. 21A and 21B depicts an exemplary BDL connector;

FIG. 22 depicts an exemplary transformation via an HTTP request;

FIG. 30 is an exemplary response object for a sales contract for goods;

FIG. 31 is an exemplary transformation for a sales contract for goods;

FIG. 32 is an exemplary message for a programmable clause for a sales contract for goods;

FIG. 34 depicts an exemplary transformation for a webhook within a workflow system;

FIGS. 42A-42C depicts exemplary user interactions with a generated task;

FIG. 44 is an alternative flowchart of a method of a preferred embodiment.

DETAILED DESCRIPTION OF THE EMBODIMENTS

The following description of the embodiments of the invention is not intended to limit the invention to these embodiments but rather to enable a person skilled in the art to make and use this invention. In other instances, well-known methods, procedures, components, and circuits have not been described in detail as not to unnecessarily obscure aspects of the present invention. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The present invention is not intended to be limited to the embodiments shown, but is to be accorded the widest scope consistent with the principles and features described herein.

Reference numbers may be made in association with their respective figures for convenience, and are not intended to strictly identify or define elements throughout.

1. Overview

Figure 1:
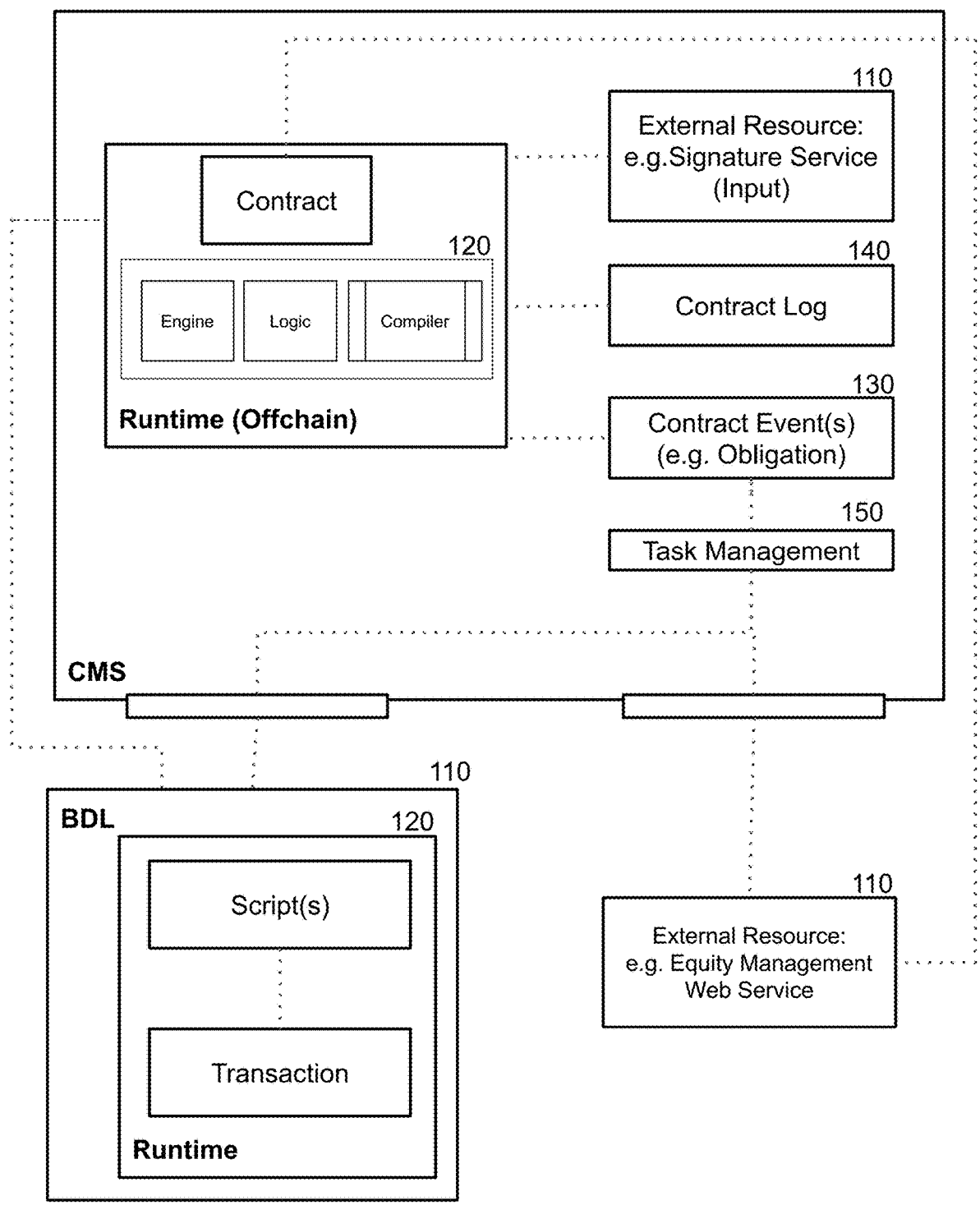
FIG. 1 is a schematic description of a system of a preferred embodiment.

The system and method functions to enable contracts to be managed and executed in a manner in which at least part of the execution of a legal contract is automatable. A contract is preferably at least partially computable/machine readable. Such contracts may be termed 'data-driven', 'programmable', 'computable', and/or 'smart'. Execution of a contract is preferably achieved by exposing external data to the contract to drive the computable aspects of the logic of the contract. A contract may be composed of one or many machine executable clauses. These may, for example, take the form of 'programmable clauses' such as those described in U.S. patent application Ser. No. 15/476,791, filed 31 Mar. 2017, which is hereby incorporated in its entirety by this reference. A programmable clause, however, may take any suitable form comprising executable logic. Contract documents may also consist of natural language elements (e.g. clauses entirely composed of natural language). Other approaches may be used with the system and method. FIG. 1 provides an exemplary structure of a programmable clause within a contract, and the relationship it may take to external resources. In some variations, other document types may be used with the system and method, but the system and method has particular applicability to contracts. A programmable clause may be a subset of a generic programmable component.

The system and method comprises providing an environment for the execution and management of computable contracts and other documents. The system and method can enable a contract to be executed and managed in a hybrid environment, enabling transactions to be executed on external resources whilst maintaining the document state and managing document execution between contracting parties.

The system and method may provide the benefits of creating and verifiably executing a legal contract or other document with executable elements in conjunction with prose-based content. As such, executable elements may be used alongside natural language content (e.g., legal prose) within a document; thereby enabling documents to act as more formal legal contracts, and capable of including provisions that cannot or users elect not to, make executable. This may be achieved with or without a blockchain/distributed ledger (BDL) system.

The system and method may provide benefits in implementing decentralized execution of components of legal contracts or other documents. The system and method may offer a more suitable technical solution over existing solutions, which often provide self-executing or automatic enforcement of code; making traditional BDL-based smart contract systems unsuitable for many legal applications/contracts. As one example, legal contracts are typically 'incomplete' in nature, as the future state of the world cannot be entirely known at the point of contract execution. Future contingencies may not be capable of description, and contracting parties cannot commit themselves to never engage in renegotiation. The system and method can be flexible to such scenarios. In another example, amendments may still be made to contract terms, which contrasts with the technical limitations of immutable on-chain smart contract code. As a third example, it is often desirable to waive rights against, and obligations imposed upon, counterparties in legal contracts. For example, commercial exigencies or best practices may dictate that a particular right or obligation is not enforced. In which case, automated enforcement can be detrimental, and enforcement should be waived and not automatically executed. The system and method may be used to selectively enforce a contract, or part thereof, when required. Unlike a system in which computation is performed entirely on-chain, the disclosed invention provides a mechanism in which execution of contract code may be separated between off-chain and on-chain environments. At least part of the code of a computable contract may be executed off-chain, interacting with an on-chain environment where beneficial. For example, a computable contract may compute a portion of its state at an off-chain runtime, and execute on-chain transactions (e.g. storing state on-chain; executing an on-chain digital asset transaction; updating/executing/deploying/calling an on-chain smart contract/script) pursuant to a computed off-chain state, where required.

By providing a computation abstraction layer to a BDL-based system, the system and method can avoid issues of coupling computation and enforcement together. The system and method may enable decoupling of state and consensus; providing a BDL agnostic off-chain computing substrate The system and method facilitates contracts that may operate both on-chain and off-chain, rather than requiring all, or even part, of the executable logic of a smart contract to run on a BDL. This may mitigate or alleviate a number of technical issues with the operation of BDL-based smart contracts, such as improving BDL transaction throughput and scalability; improving privacy of contract code and operations; facilitating versioning and increasing flexibility/amendment of contract code; and improving on-chain security by limiting code and transaction exposure to non-contracting parties and through standardization of on-chain code (e.g. via an on-chain library).

Unlike smart contracts, legal contracts typically do not require global state consensus. The system and method enables legal contracts to be executed and managed without requiring global state consensus on all operations, whilst retaining beneficial properties of BDL data structures. The system and method provides pre- and post-formation versioning and ensures the integrity of code execution. A contract log may be used to store and version the state of the contract document (e.g. executable code, configurations, prose etc.). By doing so, contracting parties may be assured that the state of the contract that is being executed is the same state as negotiated/formed.

The system and method may reduce computation costs and increase on-chain transaction throughput by selectively using BDL systems thereby providing a hybrid execution of a contract. Currently, BDL transaction throughput is often limited as compared to other enterprise transaction-based systems. All validating nodes on a BDL (another suitable network) may not have to process every transaction in some variations. In some preferred implementations of the system and method computations may occur primarily off-chain. As such, transaction or computation costs may be reduced as only the transactions/state that require global state are actually executed or broadcast on-chain'. Furthermore, the system and method may enable an increase in the complexity of contract logic and associated computation. For example, the computation (either in whole or in part) for a data-driven legal contract may be computed off-chain and the output pushed on-chain either to an on-chain script in an on-chain library to instantiate, deploy, or execute an on-chain transaction/operation/script; in a field in an on-chain transaction (e.g. as an opcode instruction, in a transaction data field, etc.); provide data inputs as an off-chain 'oracle'; or any other suitable approach/mechanism. The system and method may provide superior privacy and security properties as computation may not be performed entirely on-chain, but may be performed at least partially off-chain, but may still retain the benefits of performing actions on-chain where beneficial). These technical benefits may provide substantial improvements for legal and enterprise application of computable and smart contracts.

Where a BDL is used, the system and method may provide a means to store data off-chain in a manner that removes the need for this to be stored on-chain. This may have the benefit of decreasing the size of the BDL state history and minimizing storage on-chain, whilst retaining many of the benefits of immutability and consensus provided by BDLs that are required for legal contract execution.

The computation environment may also be integrated with a multiplicity of BDL protocols and instances of each. For example, a contract executed using the system and method may integrate with two or more ledgers of the same or different protocols at the contract level. This is beneficial as various operations, transactions, and state may be needed to be performed or shared not solely on a single blockchain or distributed ledger (e.g., a tokenized asset transfer may be performed on a first chain/ledger, a payment performed on second chain/ledger, and state shared on a third chain/ledger).

Various regulatory issues may particularly affect the use of a BDL-based smart contract system. For example, laws and regulations may impose certain data privacy requirements (e.g. rights of access to or amendment/deletion of personal data). Where contract operations are executed on-chain this privacy requirements present a potential issue for the use of BDL systems; particularly given that most BDL-based smart contract systems bundle enforcement and computation together. By removing the computation of code pertaining to the contract from the BDL layer, or at least reducing it (e.g. by only using on-chain code to execute transactions emanating from off-chain contract computation), the BDL-system may limit data storage to the transaction record.

As another potential benefit, the system and method may also improve the lifecycle management process of contracts and transactions. CLM currently requires manual management of static documents, as those documents cannot connect to existing information technology infrastructure to provide real-time state. The CLM process typically involves managing contracts indirectly by extracting data from a static, natural language, document that is then subsequently managed by users. The system and method provides the potential benefit of enabling contract data to be managed directly and/or natively without the requirement for a software middleware layer to manage contracts by proxy. Technically, this may improve the efficacy of contract management systems, with attendant commercial benefits. Furthermore, the system and method can enable transactions to be executed (manually or automatically) based upon the state of a legal contract, such as by enabling that state to be used in other systems. The system and method may enable contracts to provide real-time state across systems thereby providing a verifiable contract lifecycle, and doing so without external management of the document itself. For example, the state of a payment provision within a contract document may be computed based upon a data input, and that state used to execute an operation upon an external resource such as an accounting system, payment gateway, or similar. Similarly, the real-time price payable under a contract may be computed from delivery data and utilized in, or reconciled with, an accounting system to raise an invoice). Data from contracts may be referenced in operations performed on external resources (e.g., BDLs and via. APIs) to create associations between systems. As such, the system and method may enable contracts to become part of the enterprise information technology architecture and systems. Instead of being managed separately from one another, contracts may form part of the fabric of an organization's infrastructure. This is particularly important given that contracts establish and govern the relationships between constituents that comprise an organization, such as shareholders, financiers, employees, contractors, suppliers, and customers.

As a further potential benefit, the system and method may improve the administration of legal transactions by managing interests and obligations between contracting parties in real-time or near real-time. This may have significant benefits by enabling contracting parties to verifiably prove (e.g. to third parties) that a given obligation or interest exists. An example may be provided by way of a series of assets held on trust. For the purposes of this example, those assets comprise real property. A variety of different interests may need to be managed. An ownership interest may accrue to the trust vehicle. A beneficial interest in the properties may be established in the trust. If the properties are rented and generating income, the income may be distributed to the beneficiaries. The properties may themselves have encumbrances over them, such as a mortgage interest or easement. All of these interests are created, and may be disposed of, by contract. Managing these interests can be complex and inefficient, particularly if administered incorrectly. The system and method may assist in the administration and management of these interests, especially where they are affected by multiple contracts (e.g. mortgage contracts, contracts for sale, trust documentation, etc.). Numerous other examples of the application of the system and method are possible.

As another potential benefit, the system and method may enable the creation of a verifiable rights management system for blockchain and distributed ledger systems (e.g. intangible digital assets and digital representations of tangible assets represented on BDL systems). As such, the system and method may improve the management of interests and obligations pertaining to digitized systems. Verifiable contract obligations and interests may be used to administer the state of digital, programmable, assets that exist on blockchain and distributed ledger or other systems. For example, the system and method may be used to prove that a given interest exists under a contract at a given period of time and to manage a digital asset in accordance with the current state of that contract. One discrete example may be the ability for a contract to manage the right to create interests (e.g. a loan) over a given digital asset (e.g. a digital representation of real property) only when certain contractual conditions prevail (e.g. mortgage payments are not in arrears). Another such example may be where royalty streams programmatically generated by a digital asset are transferred to a given entity when the beneficial interest in the property is transferred under contract. Numerous other examples are possible. This enables a linkage between legal rights and obligations mediated by legal contract and their digital existence and representation on BDL systems.

Importantly, the system and method may be equally applicable to internal management of contracts, as well as management of contracts between counterparties. In the latter instance, the system and method may be used to execute and version state between counterparties in pre-formation, formation, and as well as execution stages of the contract lifecycle.

2. System

As shown in FIG. 1, a system of a preferred embodiment preferably includes: a set of input/output integrations, comprising one or more external resources 110 and a runtime 120, operable to process an electronic contract (also referred to as data-driven contract). In some variations, the external resources 110 may include API services and/or Blockchain and/or Distributed Ledger systems. The system may additionally include: contract events 130 generated by the runtime, a contract log 140, and a task management component 150. The system may include other services and/or functions as desired. The system functions to enable execution of the logic (i.e. programmable components) within the electronic contract both on a local server and on external resources 110, particularly on a blockchain and/or distributed ledger (BDL). Additionally, the system may function to enable interactions with external resources 110 that modify details of the electronic contract, modify execution of the electronic contract, and enable generation of events in relation to the execution(s) of the electronic contract. In variations including a contract log 140, the system may additionally enable upkeep of an audit log that stores state changes of the electronic contract that may in turn be used to generate new instantiations of the electronic contract on external resources 110.

Figure 2:
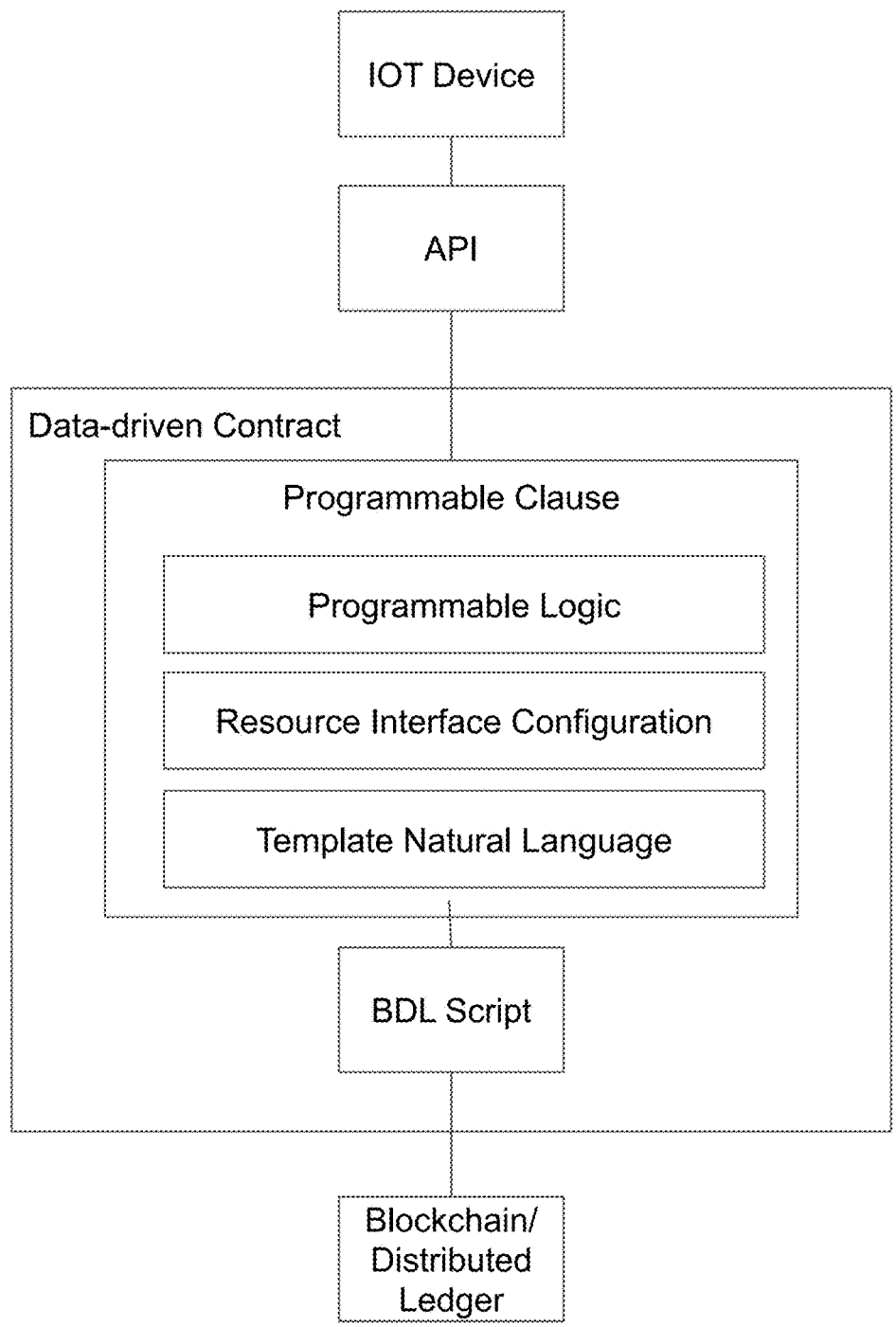
FIG. 2 is a depiction of an exemplary structure of exemplary components within an embodiment of a programmable clause within a contract.

The system is preferably used in the execution of a data-driven documents, more specifically electronic contracts (also referred to as contracts within this document) composed of one or more programmable components (e.g. programmable clauses) and natural language components. FIG. 2 shows one example of an electronic contract. Programmable clauses, or more specifically the clause logic, may consist of one or more functions, which are comprised of one or more statements and simple flow control (if-then-else, bounded loops). Various approaches may be used in defining or designing a contract and its clauses. A programmable clause is preferably a programmable component. In one embodiment, a programmable clause may be substantially similar to the programmable clauses described in U.S. patent application Ser. No. 15/476,791, filed on Mar. 31, 2017, which is hereby incorporated in its entirety. An electronic contract for use with the system and may take any suitable form. In one embodiment, a contract may be expressed solely as executable logic scripts.

Natural language may be included in inline comments, markup, or other form. In a preferred variation, a formal template model is used to define the parameters in the natural language text and logic. Together, the text and logic components may be considered an instance of a template. Logic may be expressed in any general purpose language, high level language, low level language, machine code, byte code, or any other suitable approach. Many different execution paradigms (e.g., rule-based, logic inference, temporal, finite state machine, functional, etc.) may be used. A domain specific language for expressing the logic of legal contracts may be used. A domain specific language may have human readable components, grammar, and/or syntax.

Other clause and contract embodiments may be used with the system and method. For example, contract logic may be embedded into a markup language used to markup natural language text of a clause or contract, or contract logic may be run on separate service without being bound with the natural language text, or logic and natural language may be bound together without a data model. Furthermore, the logic of a contract may be located both on- and off-chain, such as where part of a contract logic is executed off-chain and outputs passed to on-chain code to trigger on-chain operations.

Where applicable, the natural language component of the data-driven contract preferably exposes variables (parameters) through the use of a markup language or similar. Where applicable, a data model may define the data types associated with the variables. Parameters are preferably passed to the executable logic of the clause/contract.

Typically, where a contract document is at issue, the source application will take the form of a contract management system (CMS) for computable or data-driven contracts. The CMS mentioned can in some variations be substantially similar to that described in U.S. patent application Ser. No. 15/476,791. The contract management system (CMS) is preferably a document management system that includes a document editor. The CMS may additionally be used to access documents, manage the lifecycle of contracts in the pre-formation to post-formation stages, which may include the creation of a compound contract as well as facilitate document analytics and/or similar functions. The CMS may additionally be involved in input/output integrations with external resources 110.

Input/Output Integrations

Figure 3:
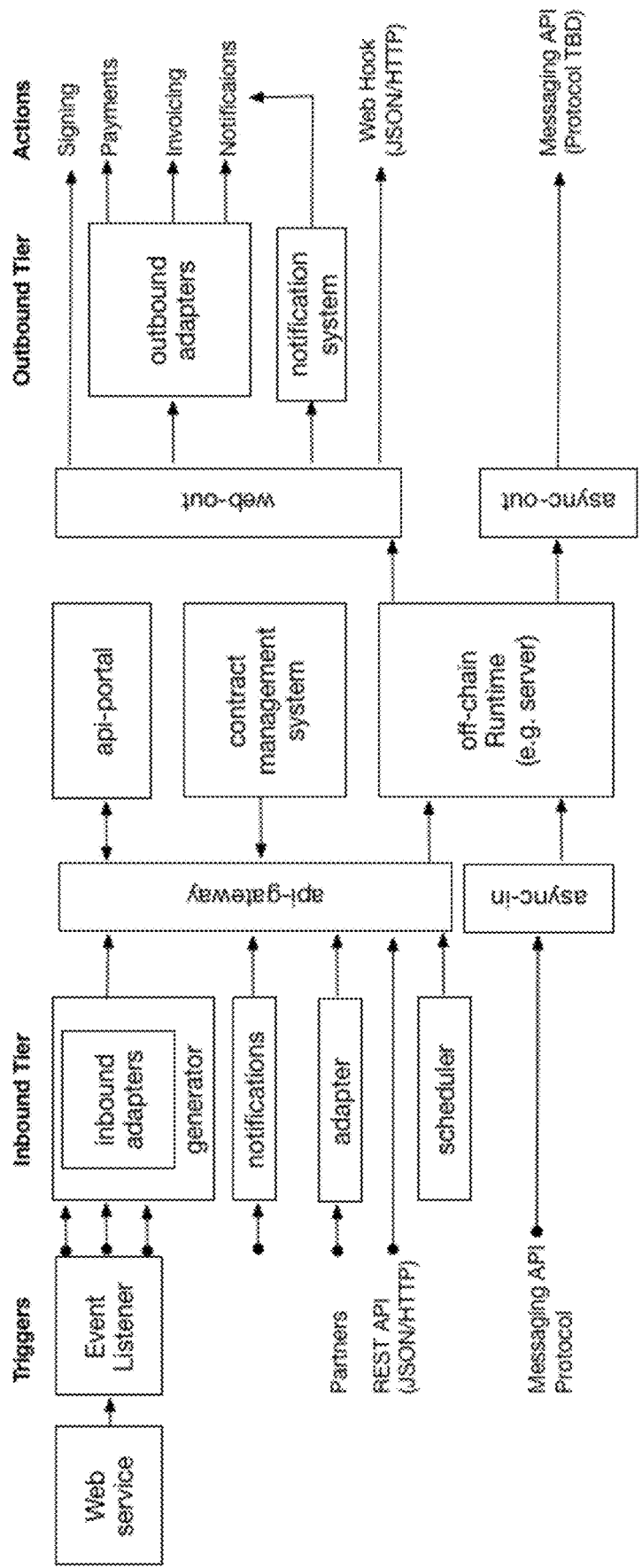
FIG. 3 is a schematic depicting an exemplary input/output integration architecture with a server embodiment.
Figure 4:
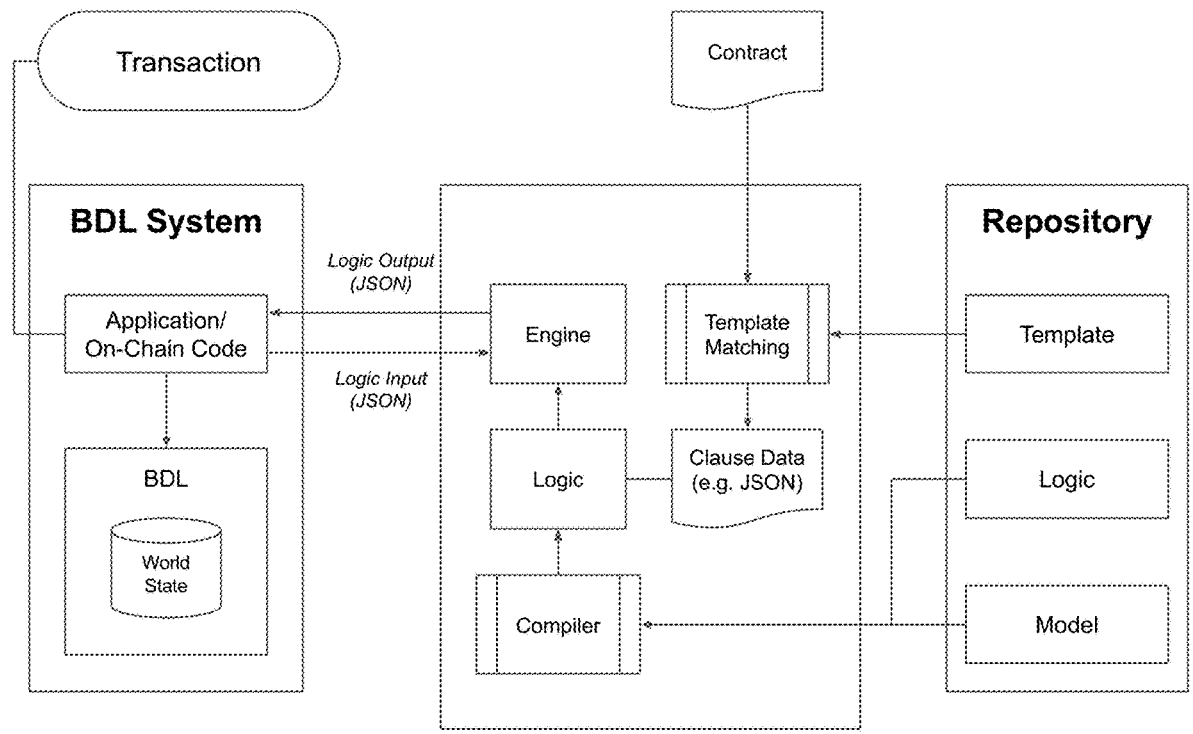
FIG. 4 is a schematic depiction of an exemplary server-based embodiment interacting with a repository system, a business network application on a blockchain/distributed ledger system.
Figure 5:
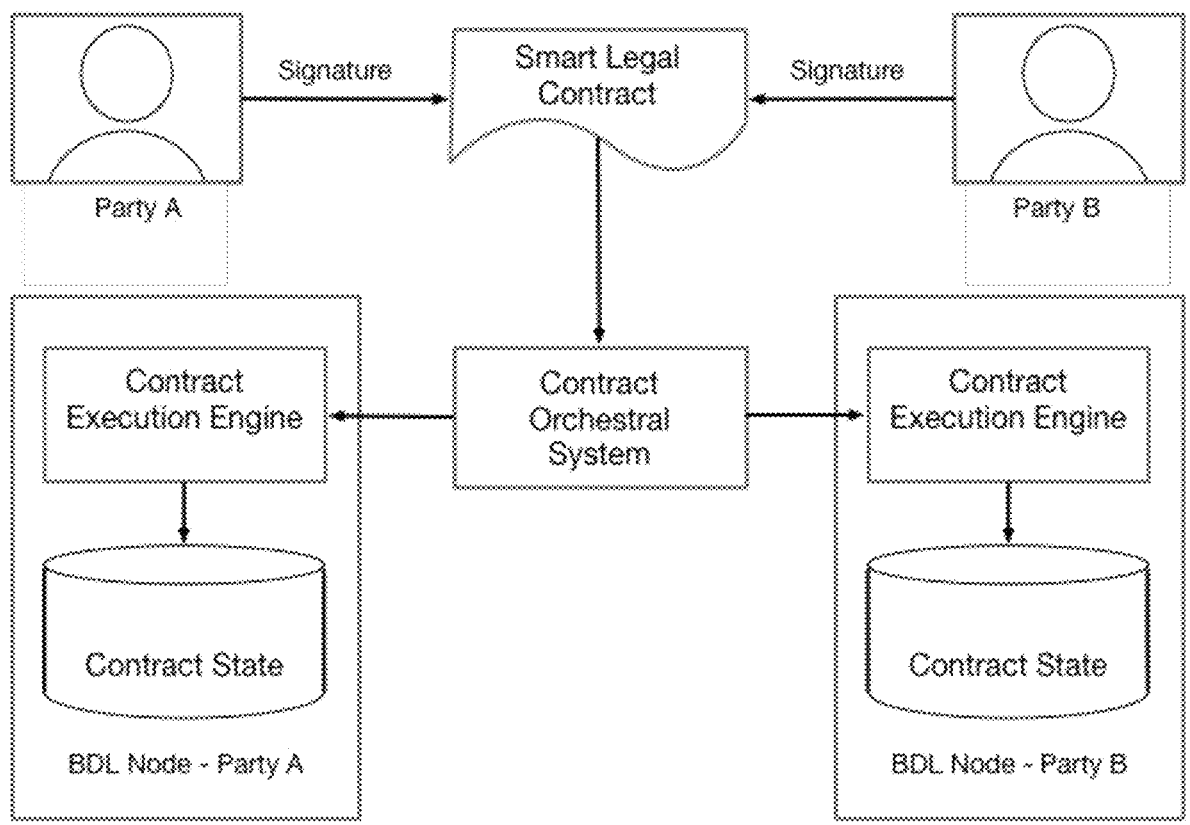
FIG. 5 is a schematic depiction of an exemplary blockchain/distributed ledger runtime embodiment.
Figure 6:
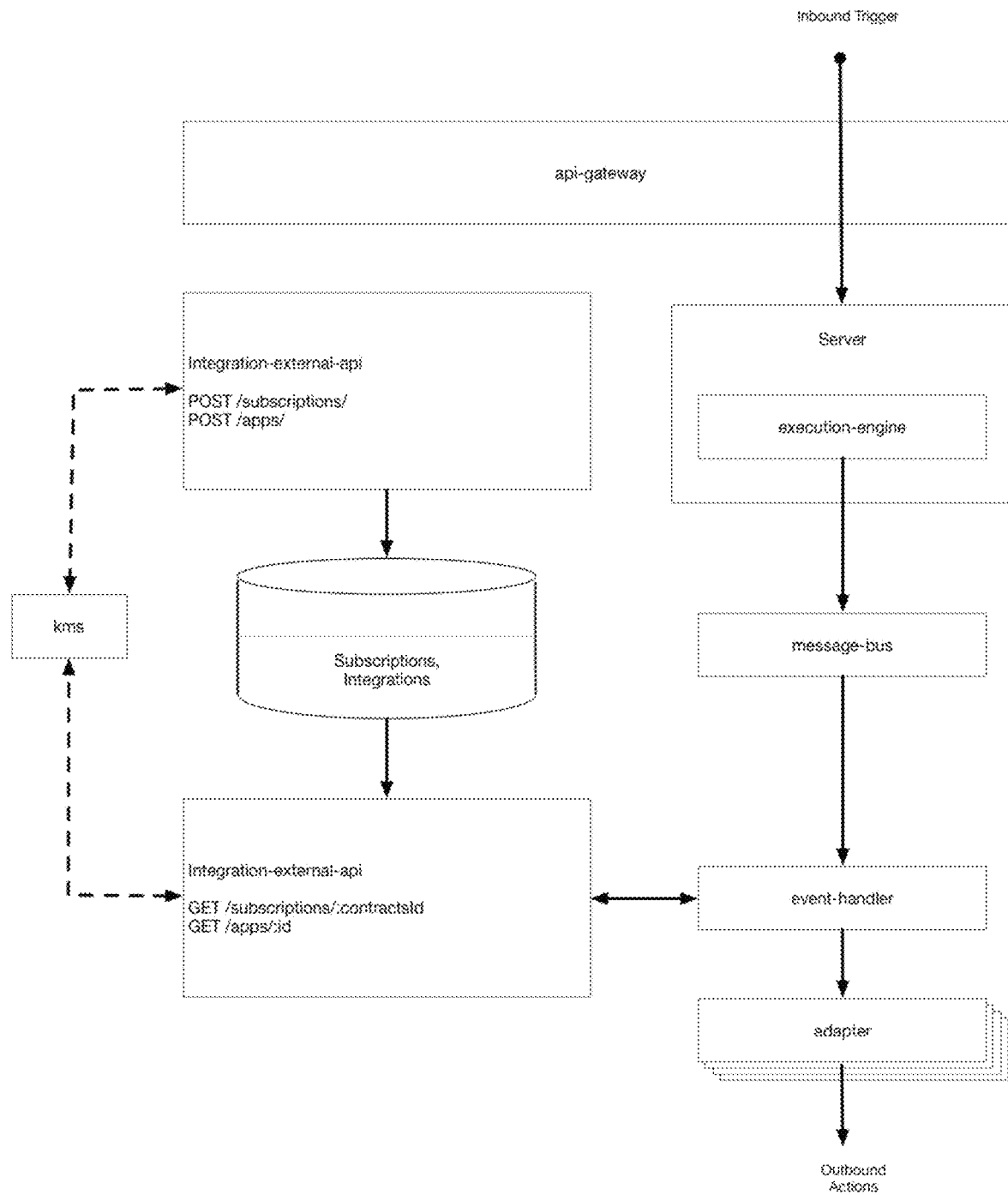
FIG. 6 is a schematic depiction of an outbound integration architecture.
Figure 8:
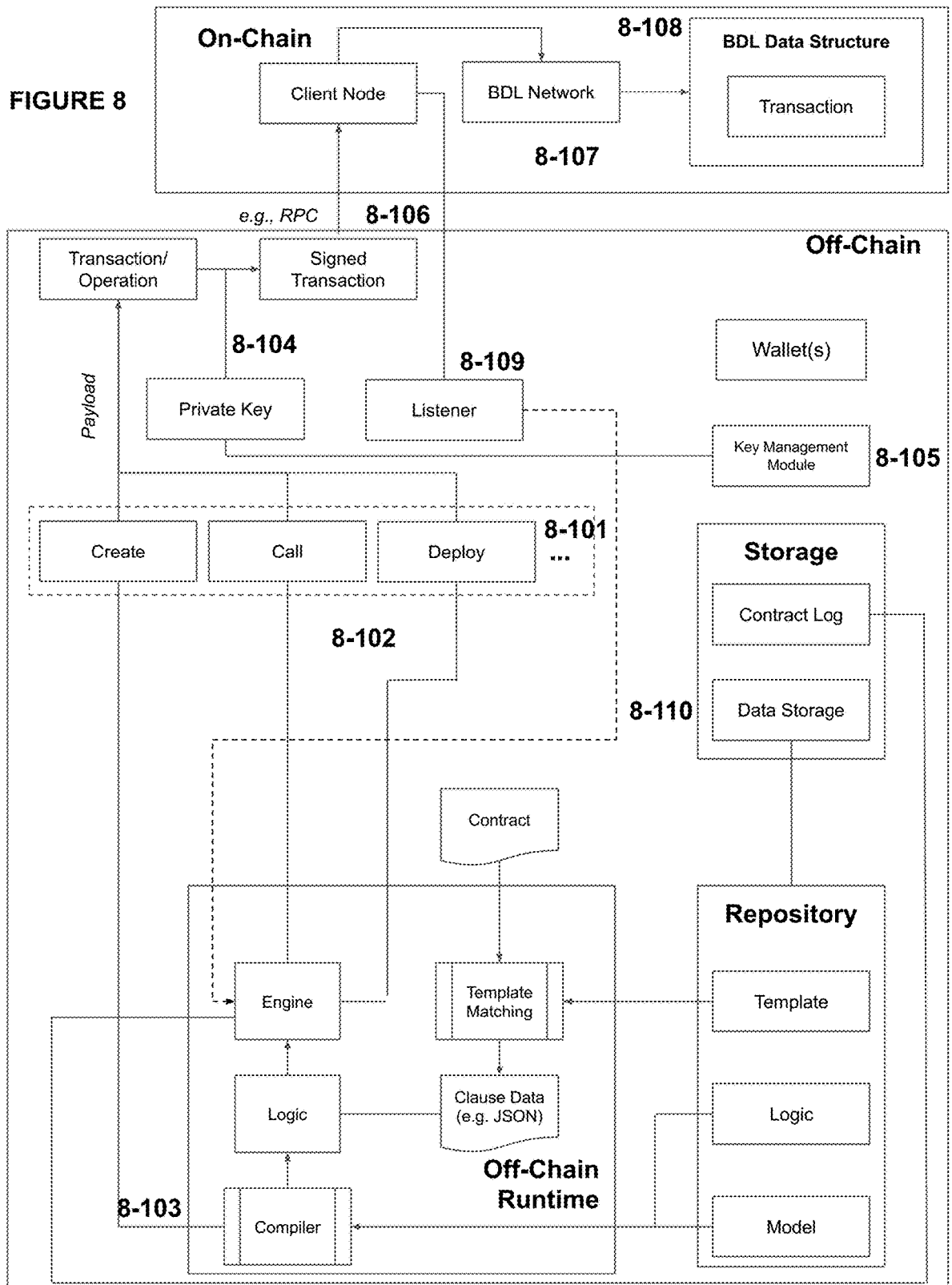
FIG. 8 is a schematic depiction of an exemplary embodiment of an interface between an off-chain contract runtime and a blockchain/distributed ledger runtime and system.

A programmable component (e.g. a clause within a contract) may utilize input data from external resources 110 (e.g. APIs, BDLs, IoT/network-connected devices via MQTT, databases, applications, systems, BDL system oracles, etc.), and may output data to external resources 110. In one example, data may be input from an external resource 110, and output to an event log (see FIG. 26). FIG. 3 provides an exemplary integration architecture in which a document, such as a contract, is executed using a server-based runtime. A server-based runtime is preferably, in some embodiments, used with an on-chain runtime (e.g. a BDL-based virtual machine runtime or a container-based runtime). FIG. 4 provides an exemplary server architecture whereby a contract can be processed and processed in an off-chain runtime and then interface with an on-chain runtime. A server architecture may be run in, or as part of, any appropriate architecture. Alternatively, a peer-to-peer architecture (see e.g. FIG. 5) or other suitable architecture may be used. FIG. 6 provides a depiction of an exemplary outbound integration architecture. Data may be output to any suitable external resource 110 to perform any arbitrary operation (e.g., a fiat payment through an integrated transaction processing system, performing an action on an accounting system via API to raise an invoice, instantiating records of a document state on a BDL system). FIG. 7 provides an example of an integration performing a BDL-based asset transaction. Inbound and outbound operations may use any appropriate messaging, communication, or other protocol (e.g., MQTT, AMQP, API, RPC, TLS, HTTP, HTTPS, websockets, etc.). FIG. 8 provides an example of exemplary integrations between a contract and a BDL.

One significant potential benefit of the system and method is that programmable components within documents may be used to synchronize the state of a document and other systems used within a transaction, business process, or other appropriate process, or otherwise interact with external resources 110. In one embodiment, programmable components may function as services that accept requests and produce responses. Programmable components within documents preferably perform transactions, operations, events, or similar on a system/application external to the document itself. Examples of external resources 110 include: contract management systems, accounting systems, payment systems, blockchain/distributed ledger systems and environments, payroll and employment systems, contract lifecycle management systems, ERP systems, CRM systems, supply chain management systems, e-signature systems, identity systems, credentialing systems, or any other appropriate system, application, or similar.

Figure 9:
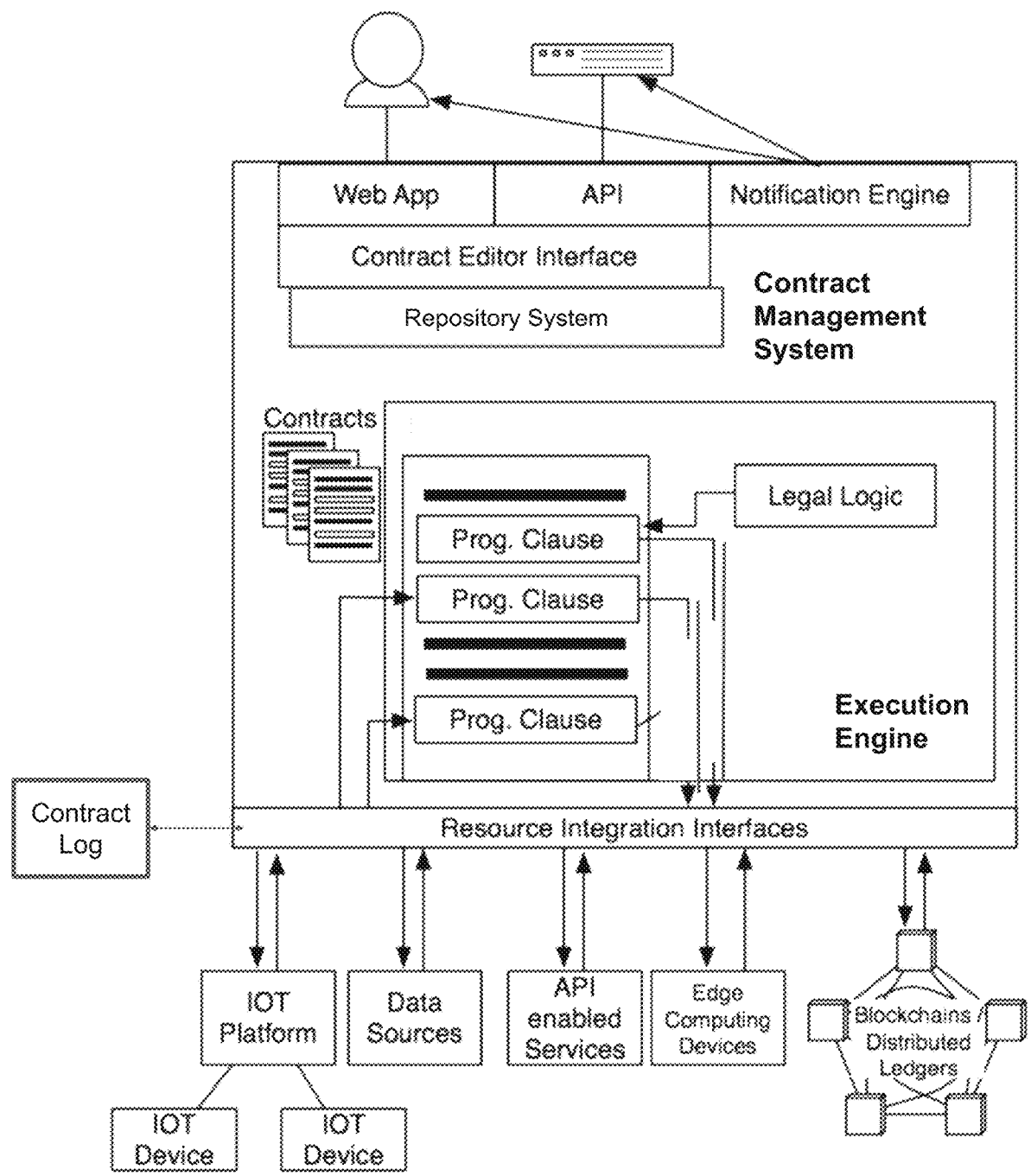
FIG. 9 is a schematic depiction of an exemplary abstraction of a contract management system.

Interfaces with external resources 110 may be configured in a variety of ways as disclosed herein. In a preferred embodiment, an interface between programmable components within a document and external resources 110 occurs through the input to, and output of data from execution of the programmable components through resource interfaces (see FIG. 9). Preferably, the interface occurs through mapping data to outbound events during the programmable component runtime (e.g. interest events, obligations events, etc.) to external resources 110. An inbound interface preferably occurs by mapping data to inbound requests. Interface with external resources 110 may be through API integration, webhooks, or any other suitable mode of communication. The interface to an external resource 110 may include the transmission of a digital communication to an external server. API integration can be used to establish programmatic integration with any suitable type of service such as a payment service, a data/analytics service, an IoT platform, web service, a communication/messaging service, and/or any suitable type of service. FIG. 3 depicts an exemplary schematic for interfacing with external resources 110. Integration may be inbound and/or outbound. Other forms of integrating a resource may be used.

Electronic signature services ("e-signature") provide one particular form of resource interface. Where appropriate, an e-signature service may be used to sign a document. Whereas e-signatures are often used with static, natural language, documents to signal a party's intention to be bound by the terms of a contractual agreement, e-signatures may be used in conjunction with the system and method to trigger computation of at least a portion of the current state of the interests, obligations, and similar that emanate from terms and conditions of a contract or other document. As such, the use of an e-signature service with programmable components instantiated within a document may extend the functionality of such a service. An e-signature service may be external to, or included in, a CMS.

Figure 10:
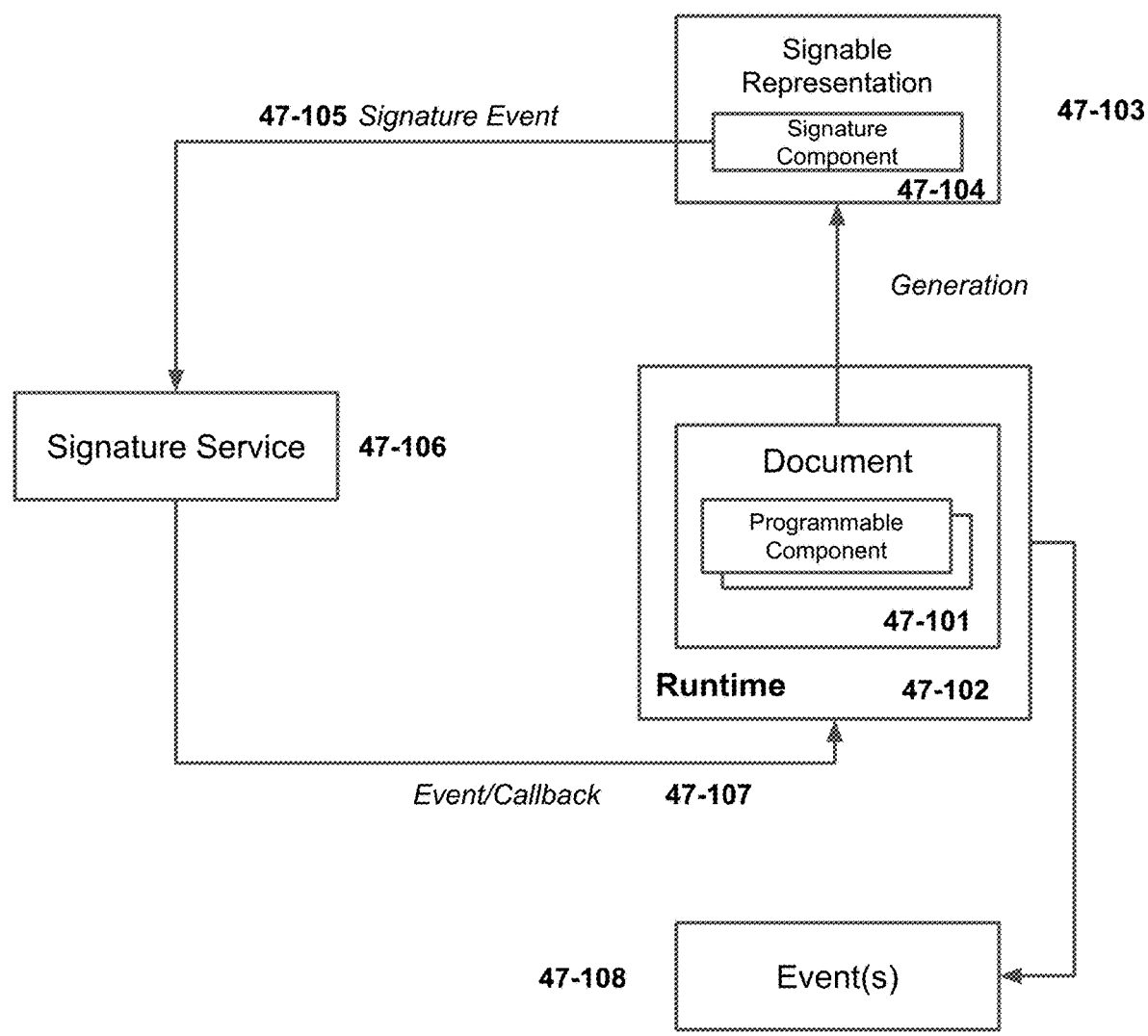
FIG. 10 is a flowchart depicting an exemplary signature event.

A signature process preferably comprises generating a signable representation of the document, such as a PDF or other appropriate document format (see FIG. 10). The signable representation is preferably a document with the natural language components of the document; comprising the natural language of the document and the natural language element of the programmable components (see FIG. 12). A signature workflow preferably involves a user of a CMS configuring the signatories to a contract (or other document) as depicted in FIG. 11. Configuration may be performed through a CMS, through an e-signature service, or a combination. In a preferred embodiment, configuration data (e.g. email for notifications and access to the signable representation of the document) for the signatories is preferably sent from the CMS to the e-signature service. As part of the configuration process, a user preferably configures the document for signature by configuring areas for signature on the signable representation of the document, the signatories that should sign in the configured areas, and the order (if any) in which the configured signatories should sign. In variations, configuration may include providing an email address for the signatories. Where applicable, this may be inherited from a CMS (e.g. an organization account of a party configuring and signing). Where obtained via a CMS, data is passed from a CMS to an e-signature service. Once a signature process is initiated, the lifecycle of a document is preferably transitioned to a signing state, and editing of the document is locked at a CMS. An e-signature service preferably handles the signature process of the signable representation of the document. Actions performed by signatories through use of the e-signature service are preferably provided as events to a CMS, which may take a form similar to any other resource integration. The nature and granularity of event notifications is preferably dependent upon the features and configuration of an e-signature service. Signature events may be used in a manner similar to any other input event or request to trigger computation/execution of a programmable component or otherwise. In a preferred embodiment, an e-signature service provides at least events denoting a completed signature process of the parties. Additionally, an e-signature service may provide an 'all signed' event to denote that all of the configures signatories have completed their respective signature processes on the e-signature service. Where the latter is not so provided, an 'all signed' event may be constructed by a CMS based upon the configuration of the signature process and the individual signature events provided. Signature events are preferably instantiated in a log for the document. An 'all signed' event may be configured to trigger execution of a contract or other document, or perform some other operation configured under the programmable components instantiated in the document (e.g. to execute at a configured time).

A wallet component of a system (see FIG. 8) may be used to store, manage, access, and otherwise interact with or deal with BDL assets, tokens, on-chain contracts, claims, credentials, or other data. The wallet may take any suitable form. In a preferred embodiment, the wallet is operated and secured through a cryptographic public-private key pair. Signing transactions (8-104) may occur through a private key stored within, or associated with, the wallet. In a preferred embodiment, on-chain operations may be surfaced in a user interface (preferably a GUI) as depicted in exemplary fashion in FIG. 13 and/or an interface for exposing transactions pertaining to the wallet to one or more users (see FIG. 14). Data may be surfaced in both components.

In a preferred embodiment, an interface for the wallet may display any or all data returned/provided by a Listener such as in FIG. 8. The data may depend upon the BDL implementation. Exemplary data that may be provided may include any on-chain operation or operation that pertains to a BDL, such as (but not limited to) transaction data (e.g. transaction addresses, internal state/storage of on-chain scripts, contracts, block details, transaction fees, transaction submission metadata and hashes, where applicable), timestamp(s), BDL state changes related to the transaction(s), on-chain script/contract addresses, on-chain object data, and other data/metadata.

On-chain operations and data stored in a wallet may pertain to tokens, represent legal claims (e.g. a token representing a lien, mortgage, interest in property, etc.), digital assets, verifiable claims (e.g. using Decentralized Identifiers), or other data/operations. For example, a programmable clause instantiated within a contract may be configured to emit a payment obligation object (see FIG. 15) in response to inbound events. A payment obligation may be configured to generate a task denoting the obligation to make payment at a task management component. A task may be configured to perform a specified operation (e.g. on a defined external resource) or the external resource 110 upon which the operation is to be performed may be undefined. A user of the system and method may utilize the task management component to execute an operation or series of operations on an external resource no (see FIG. 9) which may include one or more on-chain transaction(s) on a BDL system or across BDL systems (see, for example, FIG. 8). On-chain data, tokens, and similar may be used to configure configuration flows, execute on-chain operations (e.g. transferring a specific on-chain asset to a counterparty under a contract) or otherwise. For example, a Listener may listen for an on-chain transaction confirmation, which may be used to subsequently initiate an off-chain operation such as a payment through a payment gateway.

Figure 15:
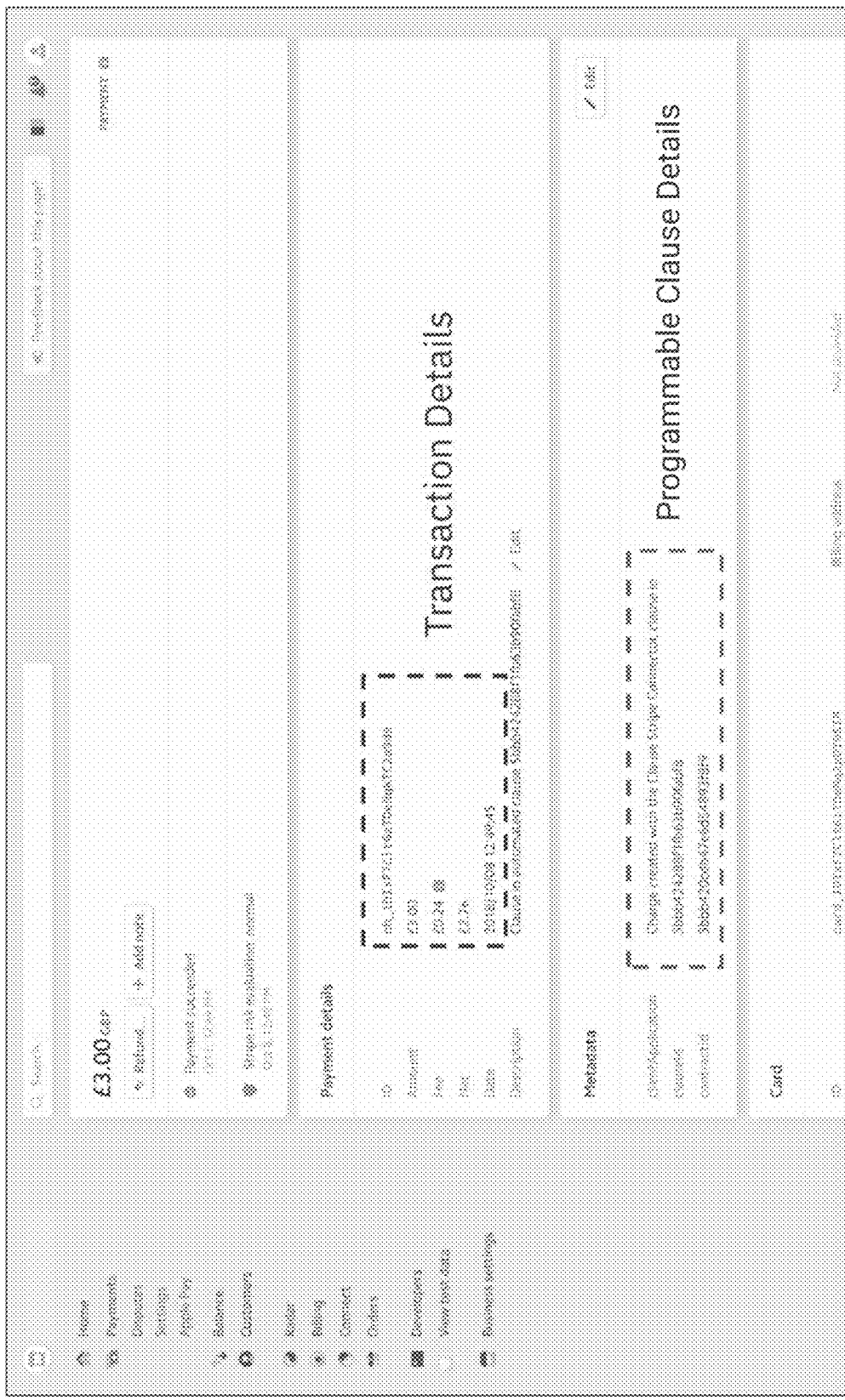
FIG. 15 depicts an exemplary payment executed through an API.

Executing an operation on an external resource no enables associations between data and operations on distinct services, as depicted in exemplary form by FIG. 15. For example: contract identifying data may be linked to an on-chain transaction (e.g. recording state computed contract/document state on-chain), and payment transaction performed (or scheduled to be performed) on a payment gateway. Further, non-limiting, examples may include instantiating invoices or line items in invoices, triggering instant message notifications, triggering or scheduling emails, initiating requests for payment, workflows, and more. Tasks and operations may be configured using configuration flows of inbound and outbound actions.

A workflow process may enable actions, such as business processes, to be triggered from a programmable component. Triggering a workflow on an external resource 110 from a programmable component instantiated within a document enables a single programmable component to be integrated within an entire workflow process that is configured externally from the programmable component itself. For example, a single programmable clause template may be configured to perform a variety of different workflows for different contract types, or the workflow configuration may be modified over time without substantial modifications to the logic or operation of the template. An external resource 110 may be configured for any arbitrary workflow for use with the system and method. A programmable clause template may be linked to a defined workflow for instantiation in each document to avoid re-configuration upon each use of a given clause-workflow combination. Instances of programmable clauses with preconfigured workflows may be stored and accessible from within a CMS.

Multiple operations may be configured to be initiated from one instance of an update to a programmable component. For example, a single response or contract event may be configured to return a notification message and initiate a workflow process.

Actions performed on external systems may include metadata and other references between documents, programmable components to associate transactions and systems. The identifiers in metadata may function to link systems together. Data may be generated by a programmable component, a CMS, and/or an external resource 110. For example, a programmable clause may emit a state object and a contract event (e.g. a payment obligation), each with their own identifiers/metadata, the payment on an external system may be approved as a task at a task management component which may itself carry a reference or identifier, and the operation on external resources no may themselves have identifying data and metadata. FIGS. 16 and 17 depict an exemplary implementation in which a payment transaction is performed through a payment gateway API by transforming a payment obligation object via a connector.

The system may include a blockchain/distributed ledger (BDL) component and/or integration with a BDL component. A BDL may be a type of external resource no accessed through a resource interface. A blockchain/distributed ledger component of a preferred embodiment may be used for data exchange, contract storage and contract execution. All, some, or none of these operations may occur on the BDL component. Any suitable blockchain or distributed ledger system may be used. More than one BDL network or data structure may be used in any given implementation of the system. Transactions may be performed on a BDL (see e.g. FIG. 8). A transaction may include any suitable operation or series of operations (e.g. updates to the state of multiple on-chain smart contracts/scripts) performed at least partially on-chain. FIG. 1 depicts an exemplary interaction between an off-chain programmable component in a contract and an on-chain script as a component part of a hybrid computable contract. More than one script may be used in a given embodiment of the system and method (e.g., one on-chain script may call another on-chain script).

A BDL may be its own distinct system component or an external resource 110. Any suitable form of blockchain or distributed ledger may be used. As per U.S. patent applications Ser. Nos. 15/476,791 and 15/640,276, contracts may use BDL in the aforementioned approaches, using additional approaches, and/or using alternative approaches. In one variation the BDL may be composed of a business network layer in addition to a distributed ledger layer. In one implementation, the system may be used as an overlay to existing BDL systems. More than one BDL network or data structure may be used in any given implementation of the system. Transactions and operations from a contract and any other appropriate or necessary action may be performed on a BDL. A transaction may include any suitable operation performed at least partially on-chain. A contract may use a BDL in a variety of ways which may include (but are not limited to):

Storing/pushing data to a BDL (e.g., an object on a BDL to reflect a contract event/state, passing data from the contract to on-chain code to execute a transaction, etc.) (see, e.g. FIGS. 18-20);

Interacting with on-chain code to perform transactions (e.g. FIGS. 21A, 21B and 22), where on-chain code can provide any arbitrary functionality, such as calling or passing messages to on-chain code (see, e.g. FIG. 8); and Instantiating code on-chain or compiling to the bytecode of a BDL system for execution on-chain (e.g. using a compiler—see FIGS. 8, 22, and 16. A compiler may trans-/cross-compile to any other appropriate platform(s) e.g. BDL system virtual machine bytecode, or any other suitable platform) (see FIG. 16).

As per U.S. patent application Ser. No. 15/476,791, contracts (and other documents) may use BDL in the aforementioned approaches, using additional approaches, and/or using alternative approaches.

Runtime

A system of a preferred embodiment includes a contract execution service (i.e. runtime). The runtime may include (but is not limited to) a compiler, and an execution engine. The runtime may additionally include other components and may be connected to input/output integrations. The runtime may consist of both off-chain and on-chain runtime environments, as depicted in FIG. 8, wherein on-chain refers to management (e.g. execution) of the contract on a BDL and off-chain refers to management of the contract on a local server. Not all components may be used in any given embodiment. Additional and/or alternative components may be used (e.g. a compiler may not be used in variations). In variations, objects may be emitted at the runtime. These may include, but are not limited to: environmental obligations (e.g. for carbon off-set for travel, office conditions such as air conditioning usage), reporting/compliance/corporate governance obligations, legal interests (e.g. liens, titles, mortgages, beneficial interests, and other security interests), etc.

Figure 23:
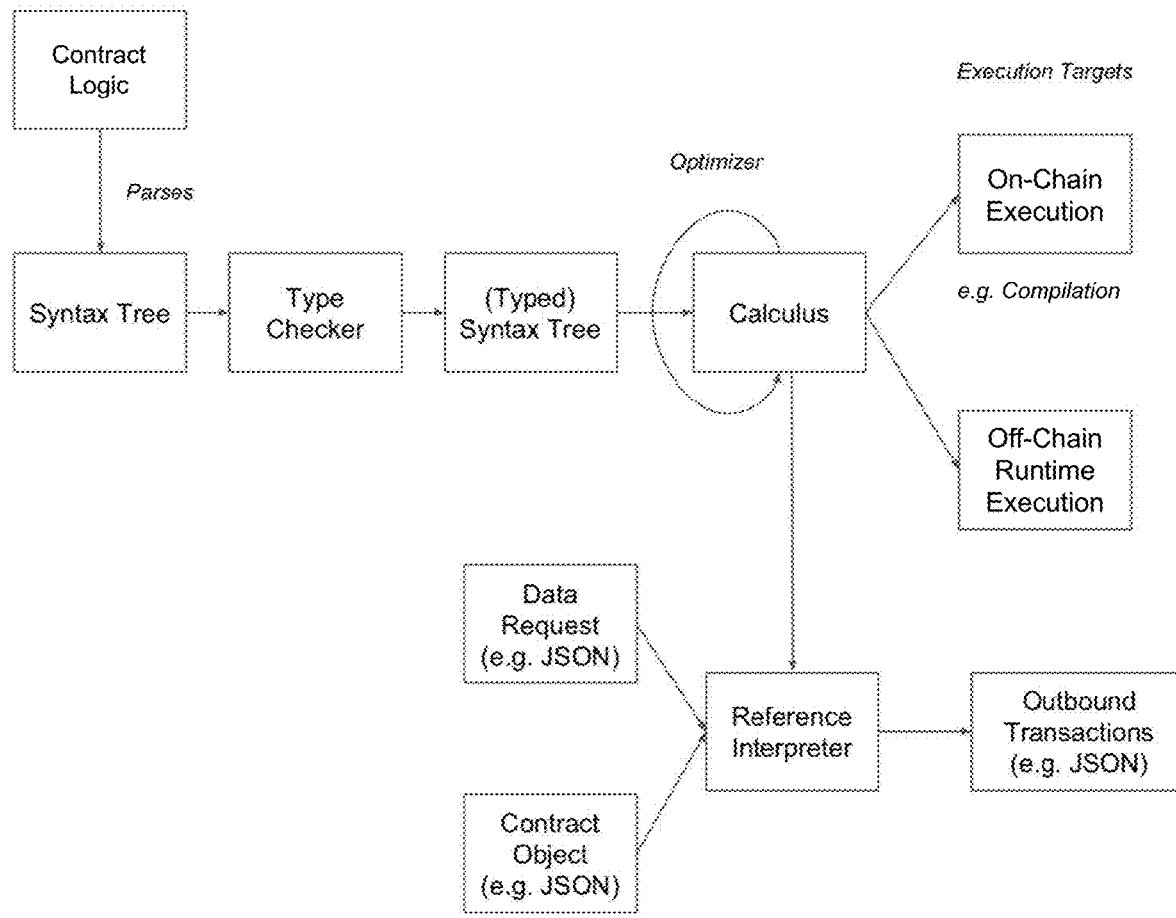
FIG. 23 depicts one exemplary contract logic flow.

A compiler of preferred embodiment functions to generate lower level code from the component logic for execution. The compiler may take any suitable form. Prior to execution, the compiler may generate code for execution using the contract logic (see FIG. 23). In one variation, the compiler generates code from a template stored in a repository. The generated code for execution may be for any variety of suitable platforms (e.g. an off-chain runtime such as a server, BDL runtime such as a container or virtual machine of a BDL node) as depicted in FIG. 23. The compiler may exist for any suitable target runtime. For example, the compiler in the system and method may generate binary code/bytecode for a BDL smart contract runtime.

The compiler may include, but is not limited to: a parser that parses a contract logic syntax tree to an executable syntax tree; a type checker that checks the validity of the programmable component logic against a model and checks the validity of the contract; a translator that translates the contract logic syntax tree to a calculus, that may "de-sugar" syntactic sugar to improve code-generation from a simpler calculus; and a code-generator that generates code from the calculus to a target language. In variations, not all components may be used. Alternative and/or additional components may be used in variations.

A compiler may also include target-specific runtime libraries (e.g. JavaScript operations to create a new contract). In addition, user-level standard libraries, for core operations (e.g. math libraries) may also be included. Preferably, the compiler supports formal verification. A reference interpreter may be called from the compiler to get expected behavior. Compiled code may be executed and checked against a reference interpreter. The compiler may also cross-compile to generate executable code for any other platform (e.g. a given BDL system, virtual machine, a microcontroller of a resource constrained device such as an IoT device, etc.). A compiler in a given embodiment may also take the form of a source-to-source compiler.

The execution engine (see FIG. 9) may be embedded across a wide-variety of form factors such as web-based, middleware, SaaS, on-chain execution, off-chain execution, and/or other suitable form factors. The execution engine may handle a variety of input types such as data input accessed over a programmatic interface (e.g. a REST API, GraphQL API, SOAP API, etc.) or other appropriate interface, simple mathematical transformations of the data from those APIs, event notifications, webhooks, remote procedure calls, data from various blockchain/distributed ledger systems, data from the execution of the contract off-chain and/or on-chain, and/or other various sources.

The execution engine may be run in a shared execution environment such as public, dedicated, or private cloud environment, on a private or shared server, on a peer-to-peer, distributed or decentralized network (e.g., within a node/client on a BDL network or without a BDL component), or other appropriate execution environment. In one particular embodiment, the execution engine may be on one or more servers. A server may be coupled with a BDL node. FIG. 3 provides an exemplary depiction of an integration architecture using a server-based embodiment of the system and method. FIG. 6 provides a depiction of an exemplary outbound integration architecture. A 'serverless' implementation may be used.

Figure 24:
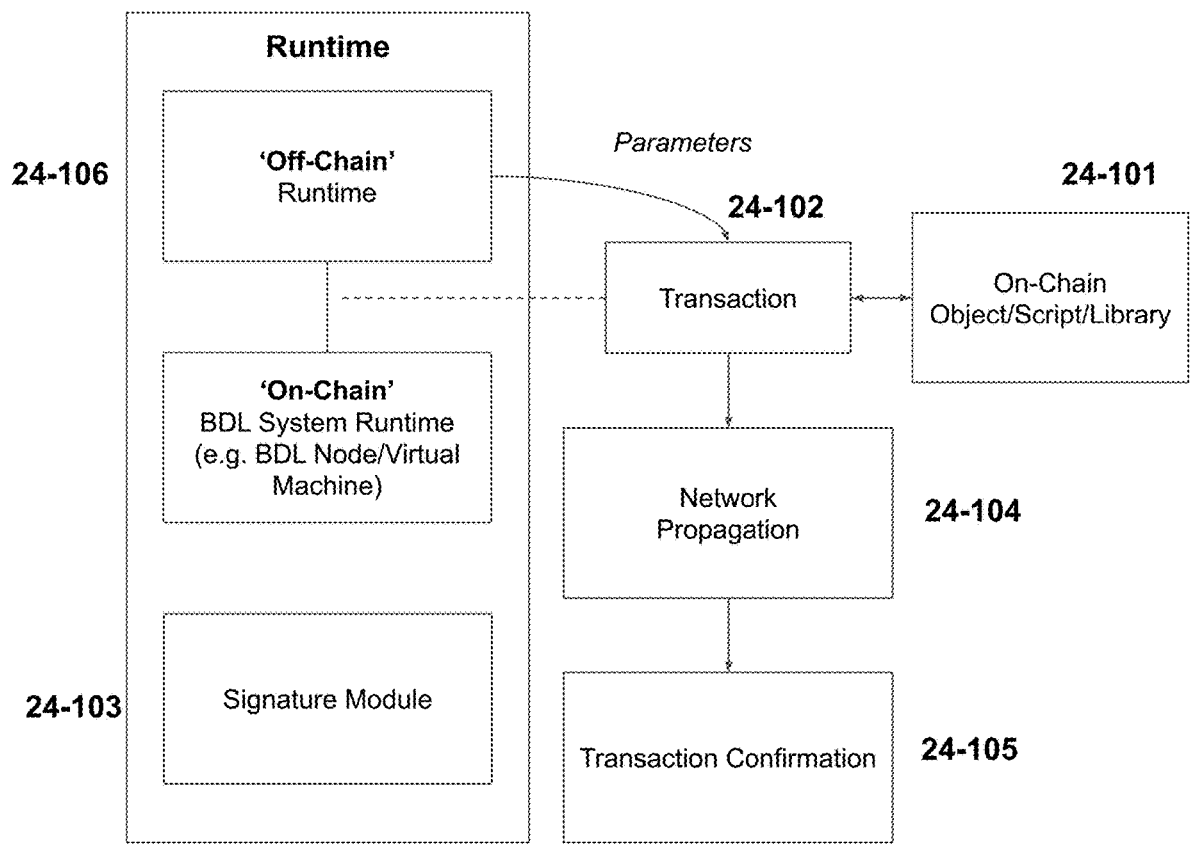
FIG. 24 is a schematic depicting an implementation of a runtime comprising an off-chain and an on-chain runtime component.

The execution engine may be a virtual machine (VM) or may form part of one (e.g. FIG. 24). A VM can be stack based, register based, a business rules engine, a program interpreter, or any other suitable type of VM. A VM may be web-based, cloud-based, run on a cluster, on a BDL node/client, or in any other suitable environment. In some implementations, the system and method are distributed through a peer-to-peer system. Peers may be: contract participants, with some interest or involvement in the contract execution; other parties, other computing systems, and/or any other suitable entity. In some variations, the system and method may be implemented within a private computing system or other suitable computing architecture, such as a cloud-based environment.

Figure 25:
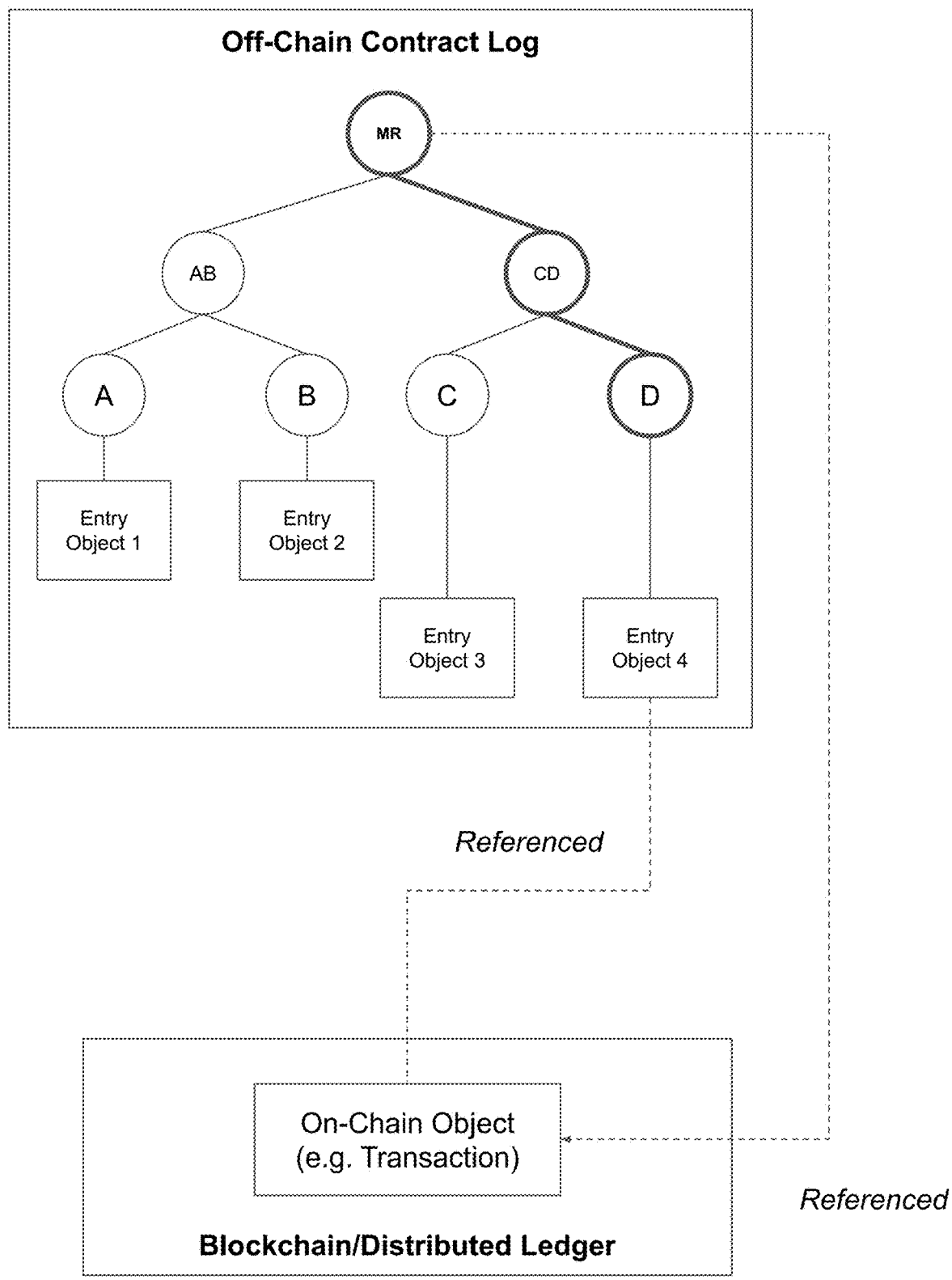
FIG. 25 is a schematic depiction of exemplary data from a contract log being referenced within an object on a blockchain/distributed ledger.

The computing environment of the execution engine may be usable for both on-chain and/or off-chain related applications. In a preferred embodiment, the execution engine provides an off-chain runtime environment and integrates with an on-chain runtime environment. FIG. 4 provides an exemplary depiction of a runtime coupled to a BDL node. On-chain can refer to transactions, smart contract code, chaincode or executable scripts of a BDL system, objects, transactions or other data; added to, computed, or otherwise processed on a BDL data structure or BDL system. The term on-chain is preferably not limited to a blockchain implementation, but is intended to refer to all forms of blockchain, distributed ledger, distributed database, and related or similar implementations or embodiments. Off-chain can refer to computing interactions not on a BDL. The term on-chain is preferably not limited to a blockchain implementation, but is intended to refer to all forms of blockchain, distributed ledger, distributed database, and related or similar implementations or embodiments. In some instances the system and method may support the integration of off-chain systems with on-chain systems. Furthermore, the system and method can act as a computing environment capable of bridging distinct systems whether on-chain or off-chain. As such, the system and method may be a hybrid. For example, a contract may be executed off-chain without a number of the associated drawbacks (e.g., privacy of execution and network scalability), as well as integration with on-chain system components (e.g., a distributed ledger or similar data structure) by performing transactions on a virtual machine or other runtime mechanism of the BDL system. The interaction may be with one or more BDLs, and may occur through a variety of different approaches (see U.S. patent application Ser. No. 15/476,791). The interaction may also make use of the Contract Log. For example, the state of a contract may be stored in the contract log, which may then subsequently be used on one or more BDLs. This may occur in a manner that is substantially similar to those outlined in U.S. patent application Ser. No. 15/640,276, which was filed 30 Jun. 2017, which is hereby incorporated in its entirety by this reference. For example, data from the Contract Log may be referenced in on-chain transactions/operations. FIG. 25 depicts one possible implementation of doing so, in which object data and the Merkle root of the contract log are included/referenced in an object on a BDL system. This object may pertain to an on-chain transaction (e.g., an asset transfer that references an event in the contract Log relating to the transfer) or instantiating/sharing state of the contract on-chain. This is not intended to be limiting. Other approaches may be taken.

A blockchain or distributed ledger (BDL) system can store the state of assets of a blockchain or distributed ledger, while the contract execution service can execute contract logic off-chain. A BDL system may be used for any arbitrary purpose. Herein, blockchain/distributed ledger (BDL) is used to refer to distributed ledgers and/or more specific consensus-based blockchain solutions, wherein any suitable variation of such systems may be used. References to BDL systems, platforms, integrations, transactions and the like could be distributed ledger variations or blockchain variations. Cryptographic databases, and/or other suitable systems with BDL-like features may be additionally or alternatively used as BDL components.

In one embodiment, the runtime may be embedded within a node of a BDL system. The node may operate on both the off-chain contract computation and any on-chain computation. The node may include a separate VM, or a VM may perform both functions. FIG. 5 depicts an execution engine embedded within a node on a BDL system. The execution engine may take any suitable form of computing/runtime environment for executing contracts. In a preferred embodiment, off-chain execution occurs through the execution engine, and on-chain execution occurs through the BDL runtime such as a BDL VM, container, or other appropriate runtime environment (see FIG. 8).

Contract Events

Contract execution may also emit event objects (i.e. contract events) in addition to a response object. Contract events are typically used by the contract to indicate that some asynchronous action should occur in the real-world such as a transaction (e.g. a payment of currency, transfer of an asset, triggering a workflow, etc.). Such event objects may also be modeled in a similar manner to requests and responses. Other additional types may be used with the system and method. A contract event is demonstrated in one exemplary implementation in FIG. 25. Contract events may be of any arbitrary type. For example, an obligation type contract event (see FIG. 27) may be used to indicate the requirement to perform or refrain from some action.

A contract event may take at least three forms. In one form, a contract event is generated by logic running solely off-chain (i.e. without execution on a BDL). In such an embodiment, logic may be run on a server, virtual machine, container, or other appropriate environment. No on-chain runtime operations are performed. In another form, a contract event is generated by contract logic running on-chain. This embodiment may enable contract logic to run where this is only instantiated on-chain, such as where scripts embedded into natural language contract documents. A contract event may take the form of any on-chain operation performed by the on-chain contract logic, such as a configured transfer of a digital asset or cryptocurrency, the updating of data stored by an on-chain script, or any other on-chain operation. In such an embodiment, an off-chain environment may operate to trigger execution of on-chain scripts (e.g. upon signature).

Figure 28:
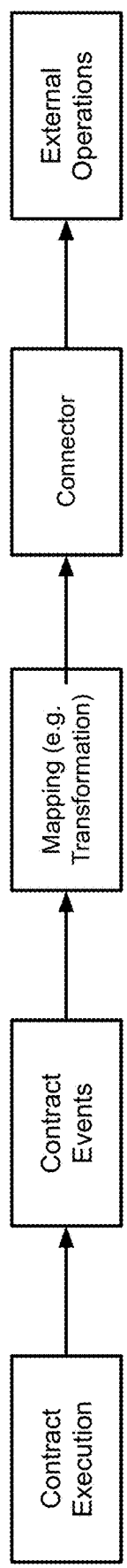
FIG. 28 depicts an exemplary protocol to receive an event.

In another form, a contract event is generated by executing contract logic both off-chain and on-chain. For example, a programmable clause may run off-chain and call a script or series of scripts instantiated on-chain and pass in data (e.g. parameters) to execute an on-chain transaction to transition the state of the network (e.g. a transfer of a digital asset). Alternatively, logic may be compiled from an off-chain environment to an on-chain runtime (see FIG. 28). For example, the logic of a document may be compiled down to a BDL runtime such as a virtual machine (e.g. WASM, eWASM, JVM, etc.) as depicted in exemplary fashion by FIG. 8. In another embodiment, logic may run in an off-chain environment data and execution data (e.g. contract events) may be mapped to external systems (e.g. instantiating objects on a BDL or other systems such as a peer-to-peer filesystem, database, application, API, or other appropriate system). Where on-chain operations are performed, an off-chain component may listen for on-chain operations and pass this to an off-chain runtime or component that mediates off-chain operations such as the creation of contract audit logs (see below) or other appropriate functionality (see e.g., FIG. 8). The latter may occur even where the off-chain component(s) do not operate to run the logic (e.g. in an embodiment where all contract logic is run in an on-chain runtime).

Objects generated from execution of programmable component(s) may be instantiated on a BDL. Contract events may be configured to transfer existing digital assets that are held on-chain (e.g. in a smart contract script) and/or generated through interaction with an on-chain script (e.g. by calling functions to generate an asset) or otherwise interacting with a BDL system for the same (see e.g. FIG. 27). Emitted objects may be used to execute on-chain operations at any arbitrary point in the document lifecycle. For example, a programmable component may be configured to execute an on-chain operation or series of operations upon a signature input event (e.g. a request) wherein the signature event (e.g. an 'all signed' event) executes a programmable component and the on-chain operation(s). In other implementations, on-chain operations may occur after signature events (where applicable) and may continue to be updated thereafter, with attendant effects based upon the configuration(s) for on-chain operations.

Figure 26:
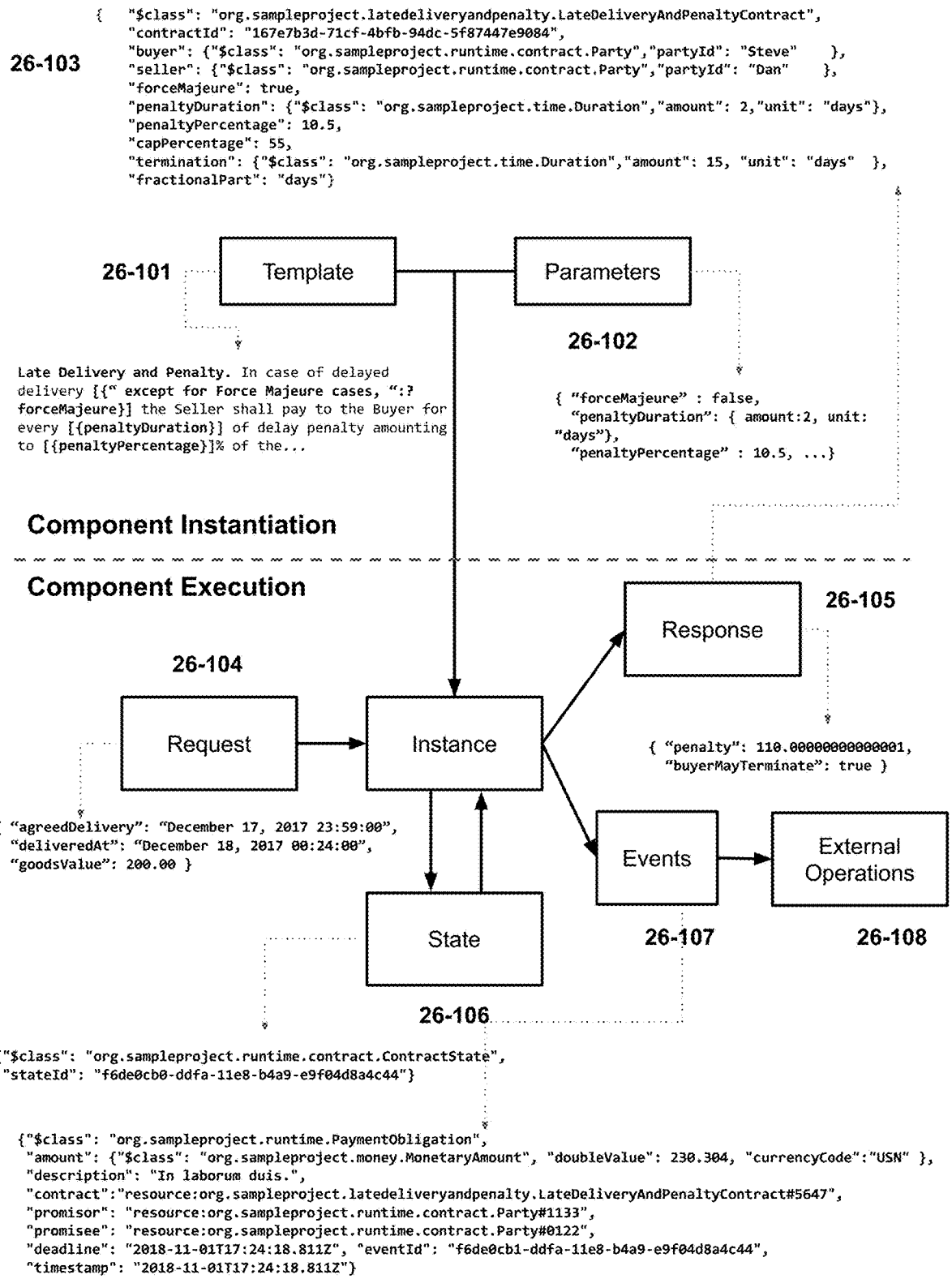
FIG. 26 is a schematic showing instantiation and execution of an electronic contract of preferred embodiment.

A contract event may be mapped to perform actions on external resources 110 (e.g. devices, applications, systems, databases, BDLs, APIs, etc.). These actions may be of any arbitrary type such as notifying a party to the contract that they need to take some action, or triggering an automated payment, invoicing, or other desired action. For example, a contract event may be mapped to a connector to perform an operation on an external resource 110, such as via an API. FIG. 26 depicts a schematic of an exemplary mechanism for instantiating and executing a contract, including the emittance of contract events and mapping to external operations. In FIG. 26, 26-101 depicts a template to generate the contract; 26-102 depicts the contract parameters; 26-103 depicts a sample implemented contract, 26-104 depicts a request sent to the contract instance and 26-105 depicts the generated contract response; 26-106 depicts the state change of the contract; 26-107 depicts an emitted contract event; and 26-108 depicts the mapping of the contract event to external operations. The process of mapping a contract event to an operation on an external resource 110 may take any appropriate form. In one embodiment, mapping a contract event to an on-chain script may include passing data (e.g. via API calls) to an on-chain script (or series of scripts) to instantiate a contract event, or representation of a contract event, on a BDL. Operations may be initiated via callbacks/API integrations, webhooks, and similar from external systems such as e-signature services.

Figure 29:
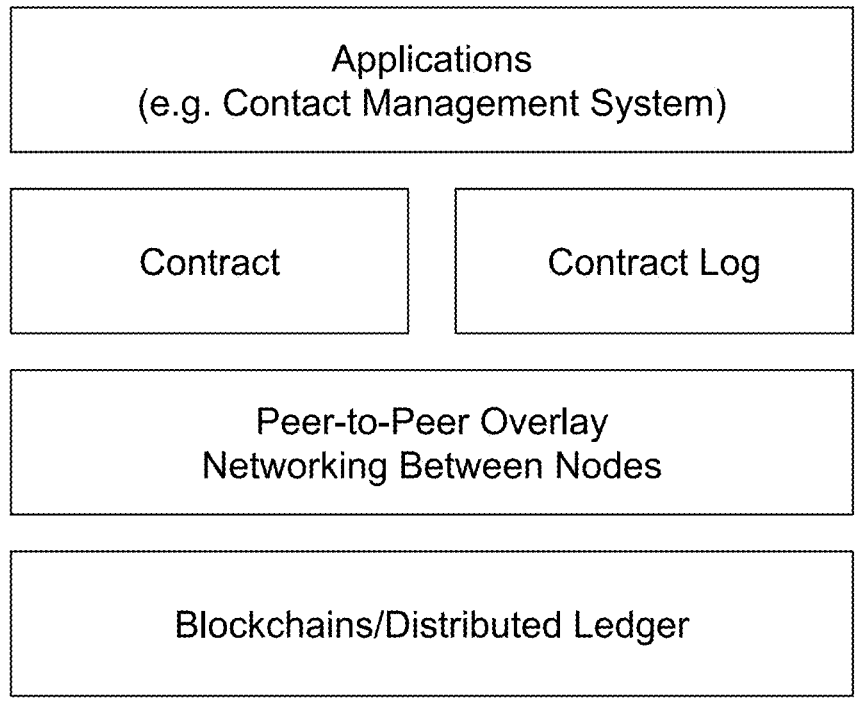
FIG. 29 depicts an exemplary transformation flow of a contract event to an external resource application.

In one embodiment, contract events may be transformed through connectors to external resources 110. FIG. 29 provides an exemplary transformation flow of a contract event with an operation on an external resource 110. FIGS. 21A and 21B provides an example BDL connector for the transformation in FIG. 22. FIGS. 16 and 17 provide exemplary transformations by way of a HTTP request and an off-chain payment charge for a payment gateway respectively. The former makes a HTTP request when invoked. In the latter example, response.amount references a 'monetary amount' object, which may reference the value (response.amount.doubleValue) and currency (response.amount.currencyCode).

Mapping and transformation for objects emitted from a runtime for a programmable component may be configured prior to being executed which may include (but is not limited to): (a) direct configuration at the point of instantiation of the component within a document (e.g. configured by a user when added to a document); (b) configuration at the template level (e.g. each programmable component template in a repository or similar is pre-configured), or may be configured subsequent to a component within a document being executed, such as through a task management module in which emitted objects are surfaced as tasks for automated, partially automated, or manual management by a user of the system and method (see FIG. 29).

Figure 33:
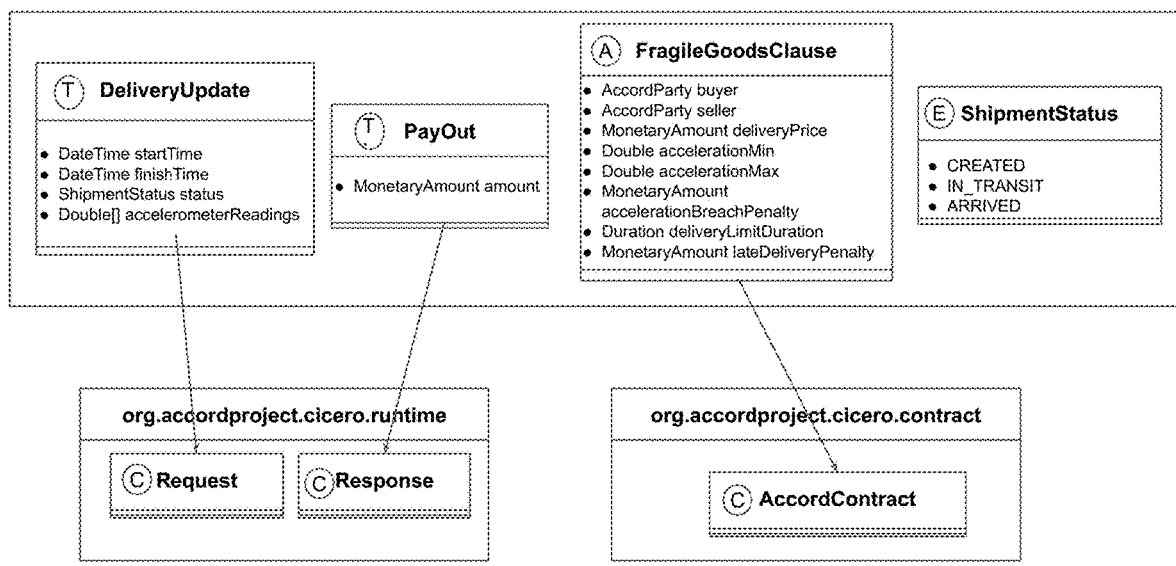
FIG. 33 is an exemplary sales contract for goods.

In a preferred embodiment, a transform may combine the response object and the event object (the raw contract event object that causes an operation to be processed). Other approaches to executing programmable clauses and performing transformations may be utilized with the system and method. FIGS. 30-32 depict an exemplary response object, transformation, and message respectively for a programmable clause. In this example, a programmable clause within a sales contract for goods is passed delivery data as a request and payment data is returned as a response when triggered, as depicted by FIG. 33. The response object is transformed into a notification message (e.g. to notify a user of a contract-related event). In one example, the notification message may be a JSON data transformation (io.clause.outbound.physical.alerts.SlackMessage). FIG. 22 depicts an exemplary transformation for a BDL-based runtime to execute an on-chain transaction.

Figure 35:
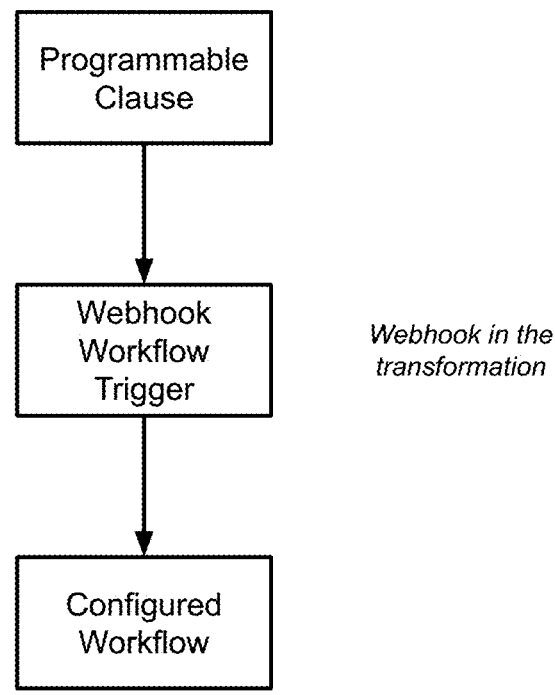
FIG. 35 depicts an exemplary flow for a programmable clause to trigger a workflow.
Figure 36:
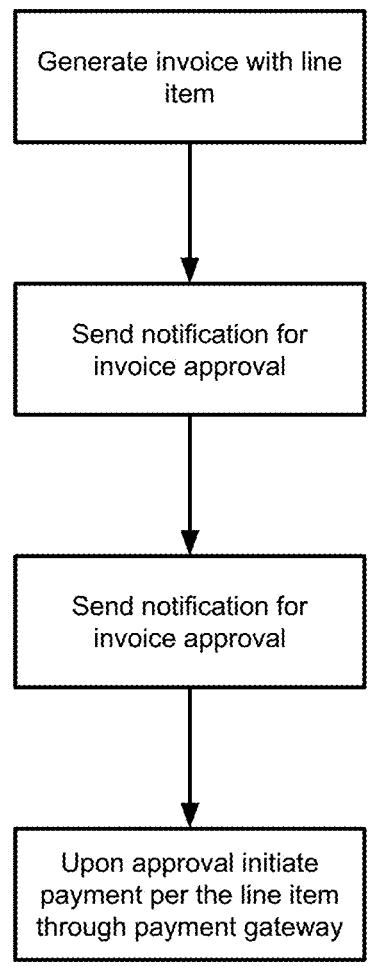
FIG. 36 depicts an exemplary workflow for the creation and payment of an invoice.

FIG. 35 depicts an exemplary flow for a programmable clause to trigger a workflow, which may make use of the FIG. 34 exemplary transformation for a webhook operable within an exemplary workflow system. FIG. 36 depicts an exemplary workflow for the creation and payment of an invoice from a programmable component within a contract. In this example, a HTTP action is invoked when a programmable component is triggered per the logic of the clause. The HTTP action utilizes a webhook for an external workflow system that itself is used to configure, by way of API integrations, workflow operations upon external systems such as accounting, ERP, and payment systems.

Other approaches besides transformation or mapping a contract event to an external resource 110 may be used to utilize external resources no. In one variation, a contract event may be compiled to the bytecode of a BDL runtime. In another embodiment, data may be passed from the document to trigger operations on external resources no (e.g. RPC calls).

Contract Log

A contract log is preferably an append-only, auditable, change log based upon the lifecycle of a contract. The contract log entries may include any operation, transaction, event, or any other action or similar. The contract log may take the form of a generalized document log.

Figure 37:
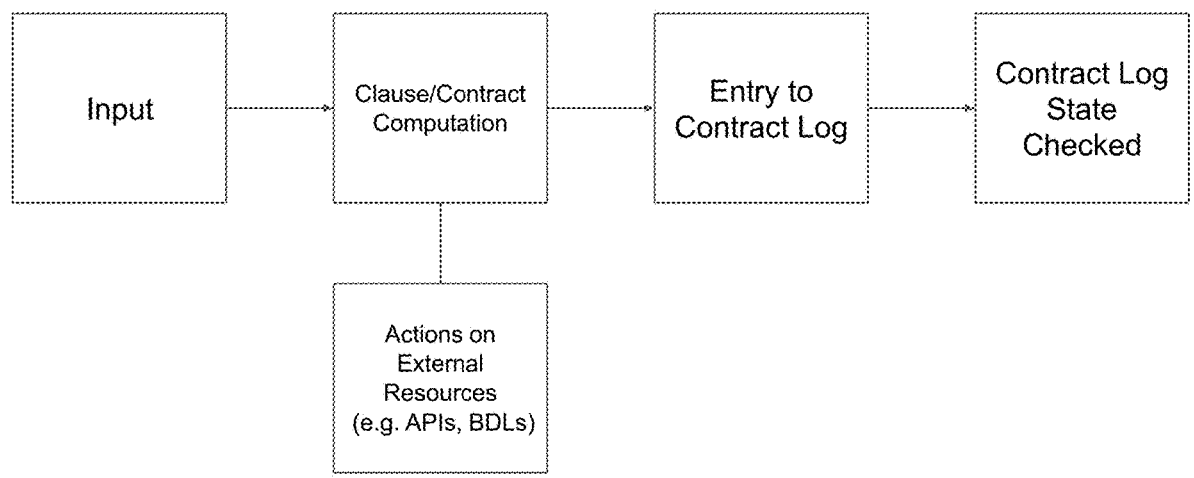
FIG. 37 is a schematic depiction of exemplary processing of a clause or contract.

The state of a programmable component is preferably computed and output to the contract log, as depicted in exemplary fashion in FIGS. 37 and 26. Each operation is preferably appended to the contract log to provide an auditable lifecycle of the contract execution. In some variations, the contract log may also include operations that occur not only in the post-formation execution phase of the contract lifecycle, but also in the pre-formation phase. For example, changes to the programmable logic, natural language text, templates, models, and any other contract-related content and metadata may be added to the contract log.

Figure 38:
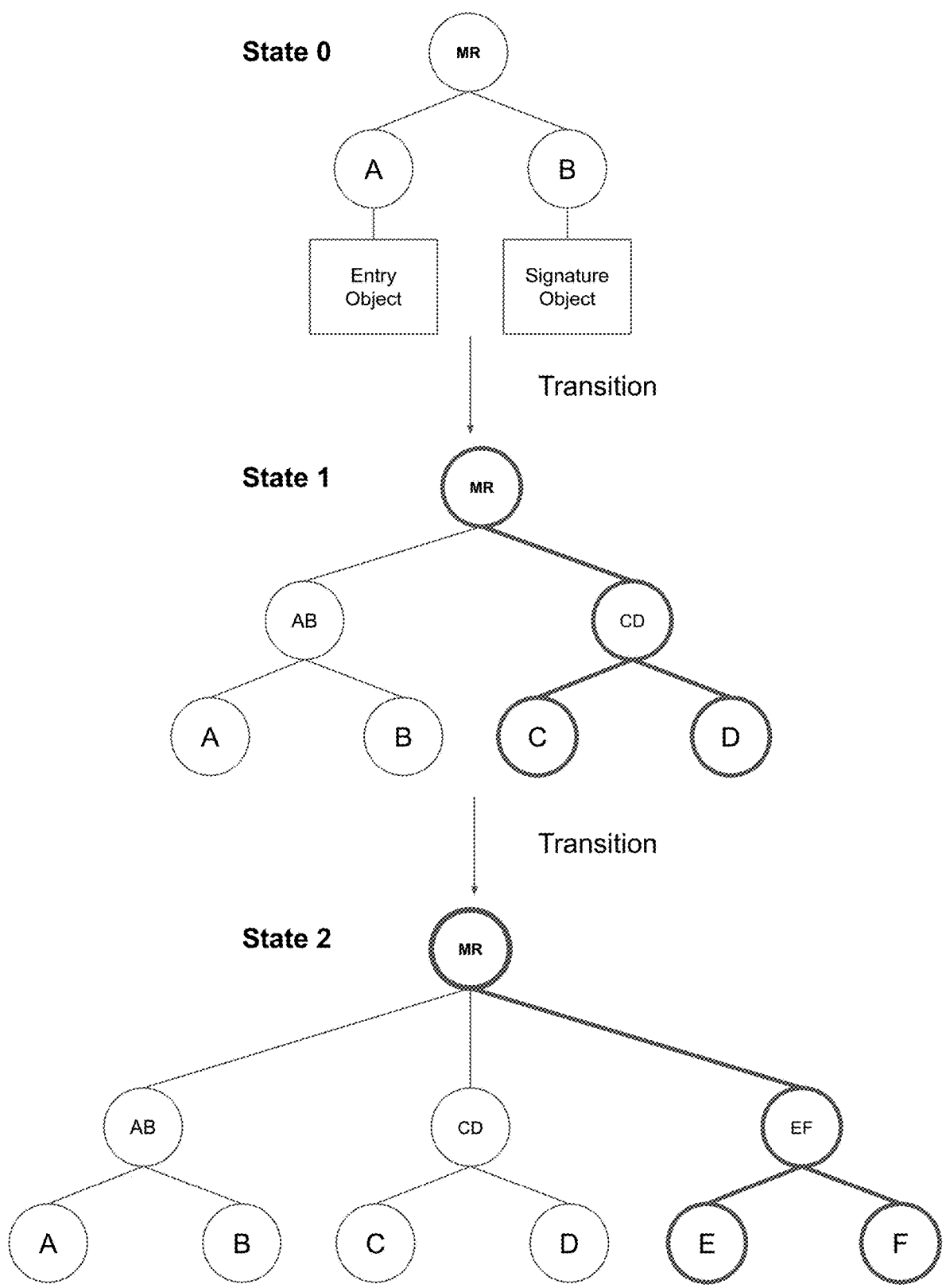
FIG. 38 is a depiction of an exemplary embodiment of a Merkle tree contract log data structure transition.

The contract log data structure may be stateful or stateless, and may be stored in any suitable storage infrastructure (e.g., database, graph database, datastore, relational database, etc.). In one particular embodiment, the contract log data structure may be stored in a decentralized or distributed file system (e.g. Interplanetary File System) or other peer-to-peer system. The contract log preferably has a cryptographic data structure (preferably in the form of a Merkle or hash tree), although other data structures may be implemented. In some embodiments, a Merkle directed acyclic graph may be used. In one embodiment, each new log entry may result in a new graph node with a Merkle root hash that represents the current state of the contract (i.e. the aggregate of all entries in the log). Objects added to the data structure may represent any data about the state of the contract. FIG. 38 provides an example in which two objects are added in each entry (e.g. an object referencing the log entry and an object referencing the party signatures for that object).

In one embodiment, entries to the contract log may be signed using a Public Key Infrastructure (PKI) asymmetric cryptographic key pair used by each contracting party. Keys may be managed in any suitable way. For example, a key management module (as shown in FIG. 8 (8-105) may be used to store and/or manage keys for signing contracts, transactions, and the like. In one embodiment, the system and method may utilize a distributed ledger to manage identities of contracting parties. A key pair may be associated with a Distributed Identifier (DID) and DID Document. The key pair may be a cryptographic key pair. A DID and DID Document may take any suitable form. Each user may have multiple public/private key pairs for a contract. A unique DID may be used for every contract and DIDs may use pairwise-unique public keys and pairwise-unique service endpoints to ensure contracting parties cannot correlate contracts from a given entity on the ledger. Alternatively, subkeys may be used. A private key may be used to sign the contract after negotiation to execute the contract, as well as to sign state updates to the contract during execution. A contract identifier and/or metadata may be added to the DID Document or shared between the parties using the DID data off-ledger. A service endpoint may be exposed to the contract management system and/or other identity management system. In one variation, access to the contract management system may be via a DID-based system or other identity management system/integration. Alternatively, no such signature mechanism, or other appropriate approaches to key management and identity may be used in conjunction with the system and method.

Figure 39:
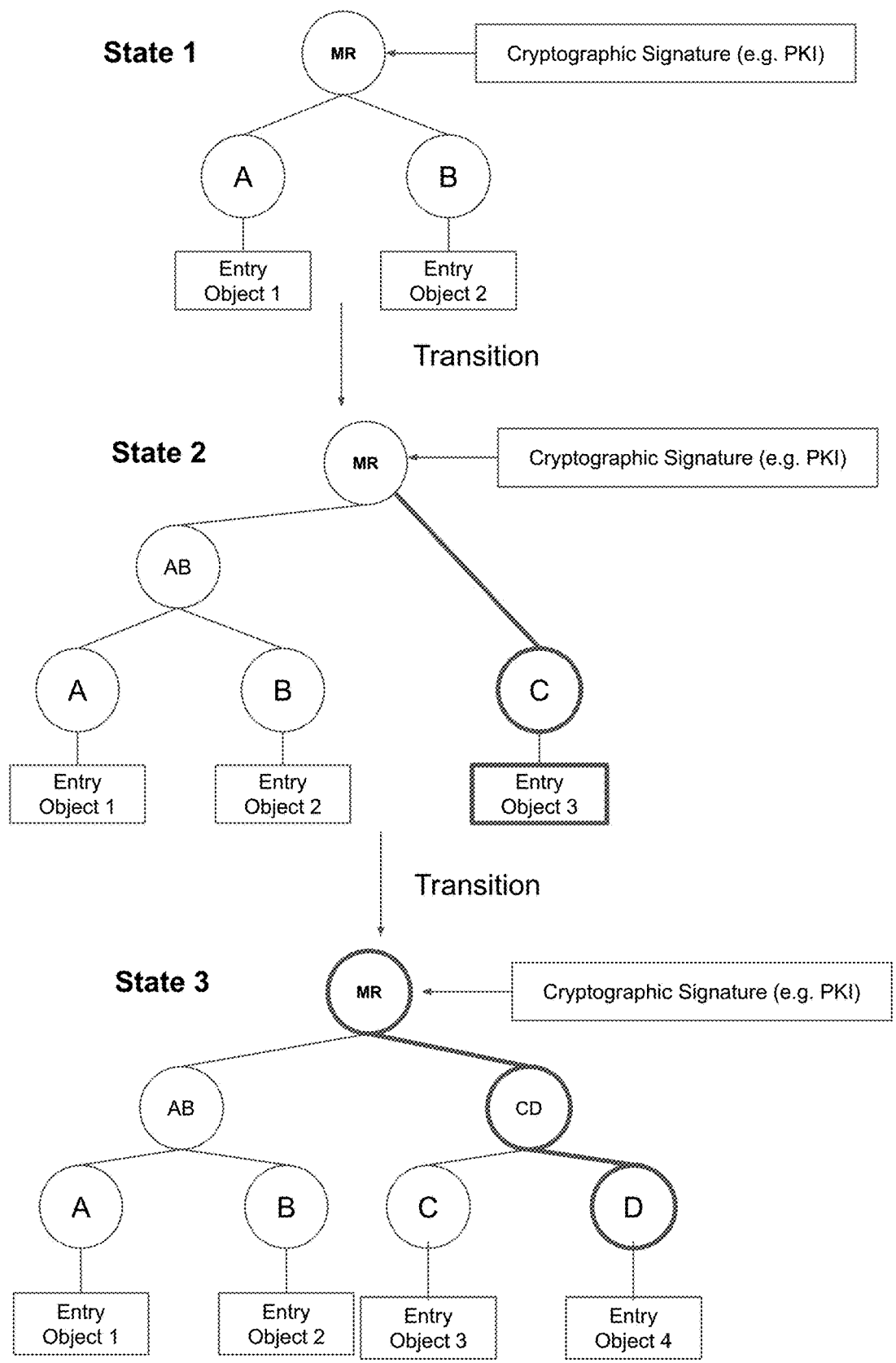
FIG. 39 is a depiction of an exemplary embodiment of a Merkle tree contract log data structure transition.

As depicted in FIG. 39, in one embodiment, each contracting party may compute the state of the contract and generate a contract log using data inputs. Each new state of the contract may be signed by the private key of the contracting party (which may relate to a DID associated with the contract and appended to the contract log of the contracting party. In an alternative embodiment, a single, shared, log may be used in which both parties sign an entry (see FIG. 38). Where asynchronous signing may occur, the contract log may act as a staging environment. The contract log may be used to capture both pre-formation state prior to computation/execution (e.g. negotiation) as well as post-formation execution (e.g. contract execution).

The contract log data structure is preferably accessed through a contract management system (CMS). In one embodiment, the contract management system may take a form substantially similar to the contract management system described in U.S. patent application Ser. No. 15/476,791 (see FIG. 9). In some implementations the CMS may be a client application. In some implementations, the CMS may utilize browser extensions.

Figure 40:
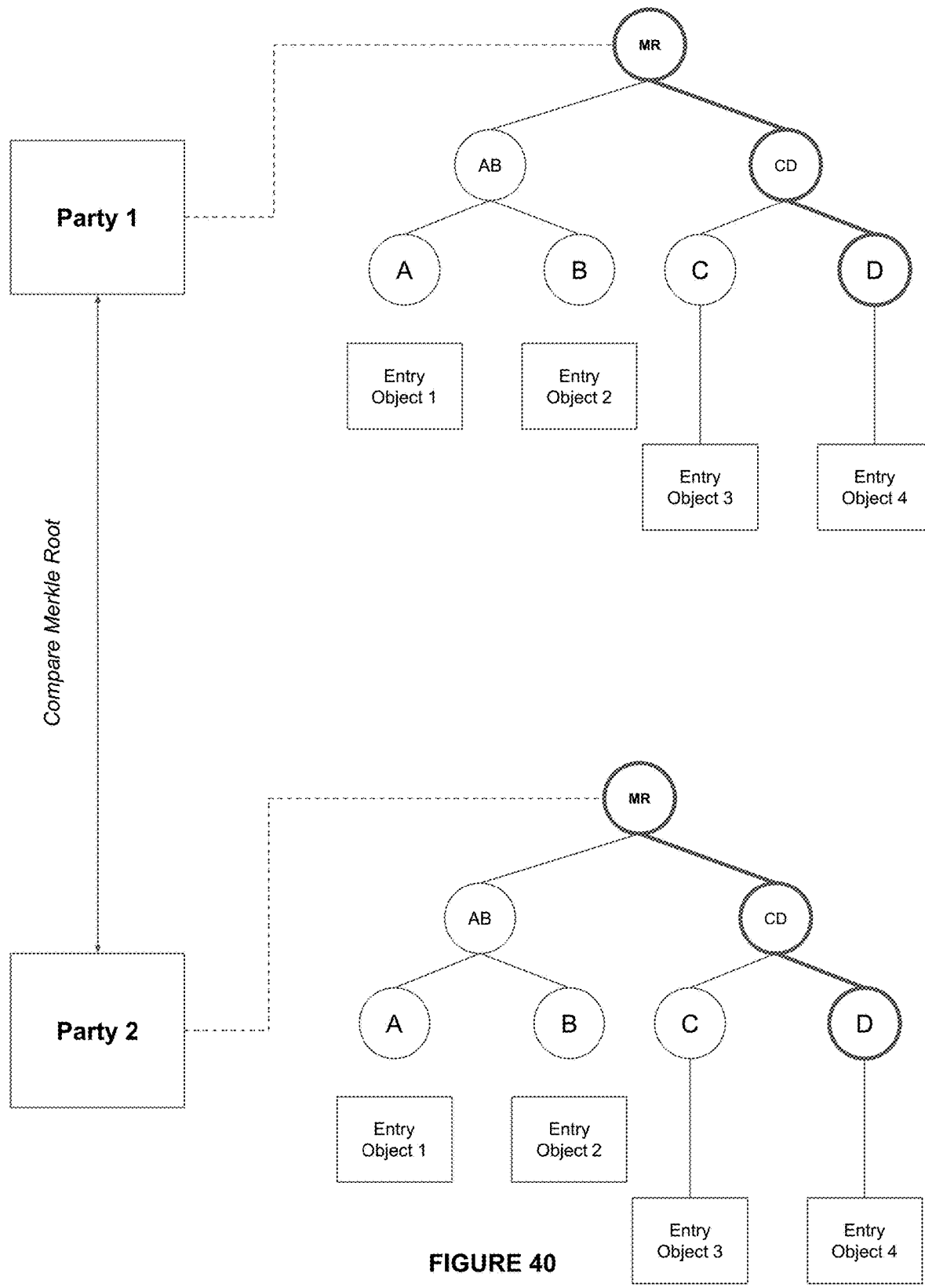
FIG. 40 is a depiction of a comparison of the root of the contract log of two contracting parties.

In variations where a contract is computed by more than one entity (e.g. two or more contracting parties), the contract state may need to be synchronized between the entities to ensure consensus upon the contract state. Consensus may be implemented in a variety of ways, which may include (but are not limited to):

Instantiating objects with a timestamp and/or other metadata containing Merkle roots on-chain within a BDL system. The BDL system may take any suitable form (e.g. it be public or private, permissioned or permissionless);

Instantiating objects containing Merkle roots on-chain and using on-chain code within a BDL system to compare the root hashes between peers. This may occur at any arbitrary interval (e.g. every state change, at timed intervals, etc.). Where applicable, each hash may be added to the state database of an on-chain script;

Instantiating objects containing Merkle roots on-chain and using an off-chain mechanism to compare the root hashes;

Comparing Merkle roots between the data structures of the contracting parties by sharing the hash (e.g., between peers in a peer-to-peer network) (see FIG. 40);

Through use of state-based or operation-based conflict-free replicated data types (CRDTs) or similar; and Through use of a consensus protocol.

The state generated by the computation of a contract or other document may be instantiated on-chain as the contract log. This may act as a distributed audit trail or record of the state of a contract/document. In one embodiment, the audit trail or the smart contract is used to generate a new instantiation of the contract, or other document, on a BDL system (see FIG. 19). The instantiated state may take suitable form (see e.g. FIG. 19-20). In variations, this may include various forms of metadata, such as (but not limited to): account scopes, content-addressed hashes of programmable clauses and other components, operation timestamps, data received from listeners for on-chain transaction data such as transaction confirmations, transaction state, state of BDL addresses and accounts, and similar. Any suitable combination of metadata may be used.

Figure 27:
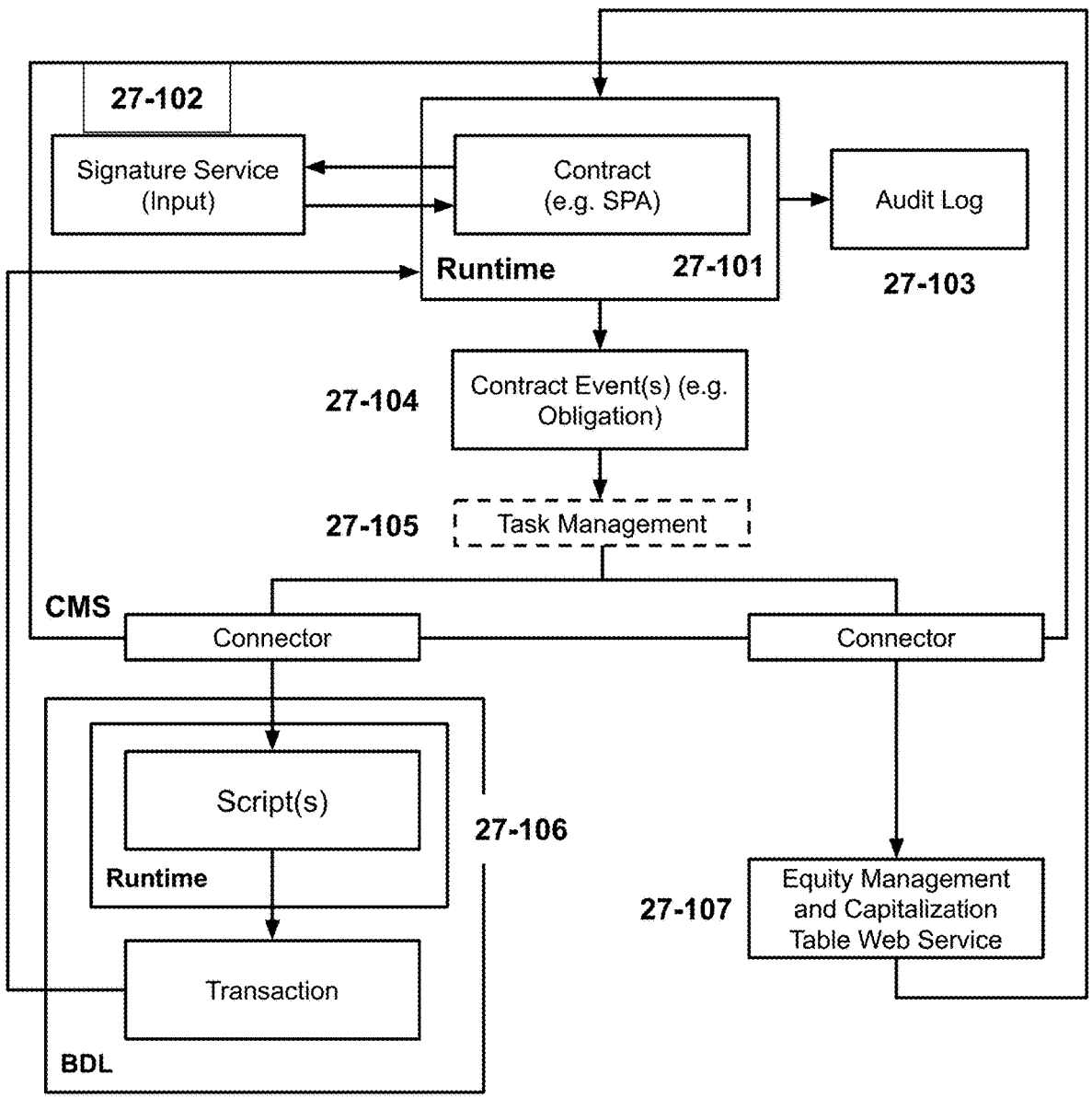
FIG. 27 is an exemplary depiction of a signature event integrated into a contract management service.

In variations, this may be achieved across BDL systems. For example, the state may be updated using an on-chain listener on BDL1 and then used as part of the state instantiated on a second BDL system, BDL2. In one particular variation, BDL1 may take the form of a private and permissioned BDL system, and BDL2 may take the form of a permissionless and public BDL system. FIG. 27 depicts an exemplary implementation, in which state objects are computed at a runtime 27-101, a state proof is instantiated on a BDL system (e.g. a private permissioned BDL system) through an on-chain script or series of scripts, BDL transaction data reflecting the transaction and/or other on-chain operations are exposed to the environment exogenous to the BDL system (such as through a listener—see FIG. 28). A signature service 27-102 may be used in providing signing functionality to the contract runtime 27-101. An output of the contract runtime 27-101 can be recorded in the audit log 27-103. At execution, a contract event may be generated 27-104 (e.g. an obligation transaction), which may then generate a task 27-105. Subsequently, the state may be instantiated on a second BDL system, which may be exogenous to the first BDL system (e.g. a public permissionless BDL system) 27-106. Additionally or alternatively the event may lead to an external execution (e.g. on an equity management web service). These examples are non-limiting; BDL systems may take any suitable form in each instance.

Task Management

Figure 41:
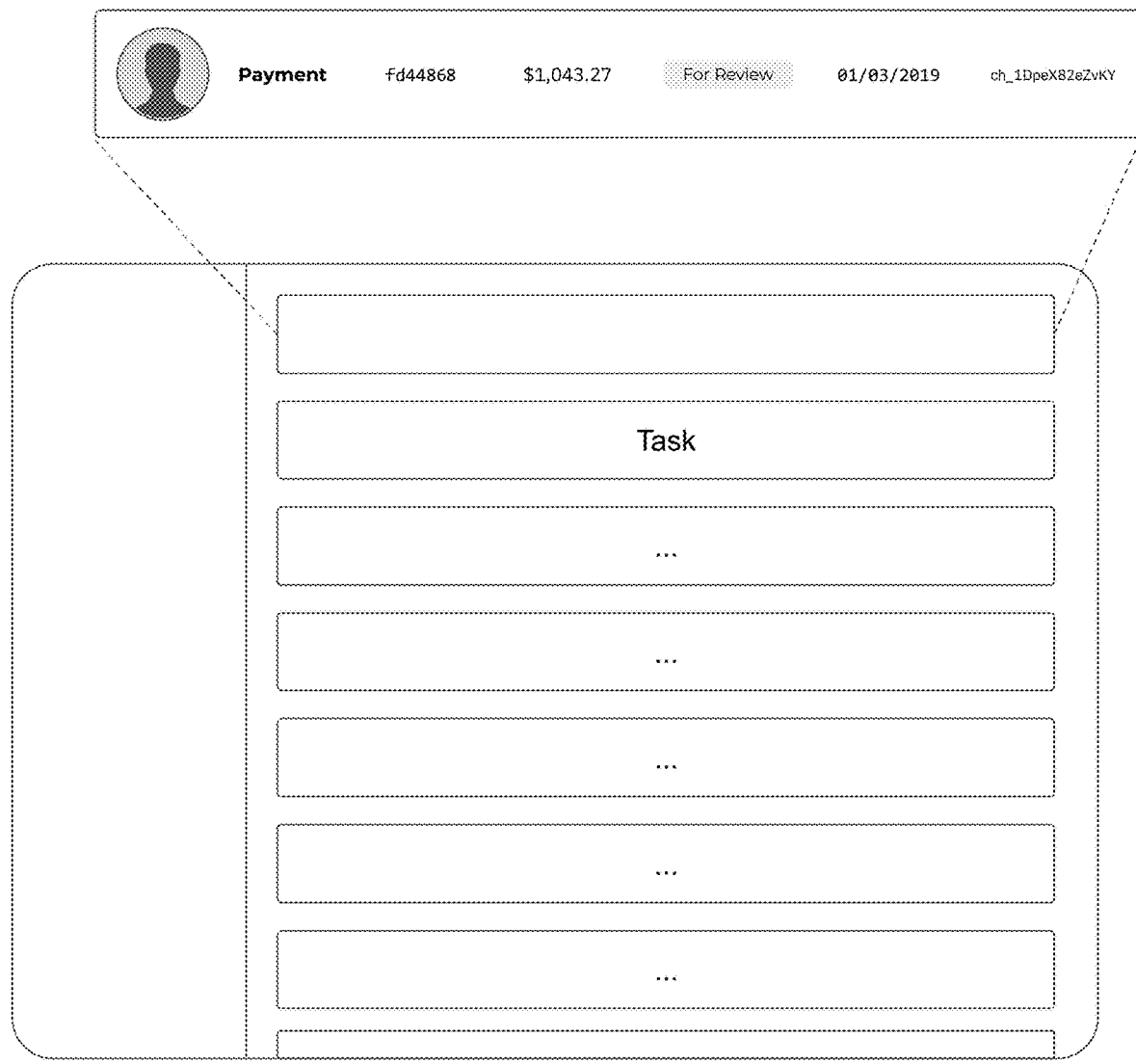
FIG. 41 is a depiction of a task management user interface.

In some preferred variations, the system may include a task management component. The task management component may also form part of a CMS (or other document management system). A task management component preferably exposes contract events and external actions to a user of a CMS. Events may be pulled directly from the same source as the contract log for a contract and/or from the runtime environment (see FIG. 27). In a preferred embodiment, a task management module aggregates and collates events scoped by contract for display to an end user. Display to an end user preferably occurs through a user interface such as a GUI. In one embodiment, a task management component may expose data to a user of the system and method as a dashboard or series of dashboards, as depicted in exemplary fashion in FIG. 41. In variations, a multiplicity of data visualization tools may be used to provide analytics and other data to users on the status of tasks. For example, data exposed in contract event objects may be used to show changes to the status of contract obligations over time, time elapsed since obligations became effective, overdue obligations, etc. Dashboards may also provide analytics and data visualization across a corpus of contracts (e.g. all contracts with an overdue obligation).

The task management component preferably enables users to interact with contract events and other forms of contract action. For example, a configured action such as a payment may be queued as a task (e.g. pre- or post-transformation) requiring user initiation (e.g. a signatory to a contract or a user within the signatory's organization scope), such as approval, before being pushed to a payment gateway. This enables the state of a contract to be computed, including contract operations on external systems, without triggering execution on the external system directly from a programmable clause. A programmable component may be configured to bypass task management where required. Similarly, exceptions (e.g. configured parameters such as payment values) may be defined to automatically approve/execute suitably configured operations. For example, a configuration may be set to automate all payments with a defined range such as $0-$1,000. Alternatively, tasks may be assigned to users of the CMS based upon similar configurations (e.g. certain users are assigned certain tasks based upon the value of a payment obligation emitted at the contract runtime). In one embodiment, this may be based upon a data model of the contract/clause (e.g. where a payment with a defined monetaryAmount is within a defined range). A task management component may be permissioned such that access to certain tasks is only accessible to certain users of an organization with a CMS. Conditionals, permissions, or workflows of any arbitrary complexity may be supported. For example, approval for payments within a defined range except where a contract from the same counterparty has not be paid and that contract includes a netting provision that is in a defined state (e.g. active). This may, therefore, enable a contracting party to offset the payments owing from that contract against the aforementioned amount payable. In an alternative embodiment, such a function may be delegated to a suitably configured external workflow system, as disclosed herein (see FIG. 42B). In further embodiments, no task management component may be used.

A task management component may be used to trigger notifications and messages between users of the CMS or contracting parties using the CMS. For example, in the former instance, configured users of the CMS may be notified of a contract event being generated as a task. In the latter instance, where the aforementioned exemplary netting process occurs, a notice may be sent to the counterparty.

A task management dashboard may enable users of the system and method to track operations that have occurred, or should occur, under a given document. The task management dashboard preferably displays all of the tasks pertaining to contracts/documents to a user of the system and method. A task may include any operation performed in relation to a contract or other document. In one embodiment, a task may include an operation that is performed as a result of execution of a contract/document, or requires operations to be performed by a user of the system and method, such as a contract manager, based upon computational operations of components (such as programmable clauses) within a document. For example, a payment event emitted by a component (see FIG. 26-107) may be transformed to a payment to be made on a payment gateway (see FIG. 15) but queued up as a task pending approval/execution by a user (i.e. not yet executed on the payment gateway).

Tasks may be scoped to the user-level and organization level of the CMS. For example, tasks may be permissioned (e.g. only users on the CMS with certain credentials/authorization may view and/or execute) or assigned to users within the scope of an account, such as an organization, based upon rules (e.g. parameters in the programmable components meet certain rules such as a price not exceeding a stipulated value).

Task management may specifically include management of operations, tokens, digital assets, objects, addresses, claims, and others on-chain. As depicted in exemplary fashion by FIG. 8, one embodiment of the system and method may include a listener, wallet(s), and RPC interface.

Additional and/or alternative components may be used without diverging from the spirit and scope of the invention. Utilizing such components, the system and method may enable the management of tokenized assets, obligations, interests, claims, and similar.

In a preferred embodiment, a contract/document is executed at an off-chain runtime. Objects emitted at an off-chain runtime (see FIG. 26), such as contract events, may be mapped to tasks that may be managed at a task management function within a client application, such as the CMS. A task (see FIG. 27) may be used to execute an operation on any external resource 110 and/or within the CMS. A task may be used to enable a user of the system and method to approve execution of an operation on an external resource 110 or CMS. Tasks surfaced in the task management dashboard may also be surfaced in audit trail/contract log (see FIG. 13) for the appropriate document/contract. Completed and pending tasks are preferably added as log entries/events on the contract log to provide a history of the contract. For example, an object may be added to an audit trail when a task is created, including (but not limited to) the timestamp of the task, assignee within the scope of an organization within the CMS, pending external transactions linked to the task (e.g. a pending payment, token transfer, etc.). In variations, a task management function may not be used.

An operation on an external resource 110 (whether by way of a task, mapping/linking or use of an emitted object) may take the form of an API operation or series of operations, over a remote procedure call, HTTP, webhook, MQTT, or any other suitable mode or means of communication. An external resource 110 may include a BDL system or series of BDL systems. An on-chain operation may be performed by calling, deploying, initiating, or otherwise interacting with on-chain scripts of a BDL system 8-101; 8-107-108. On-chain script(s) may be executed or otherwise interacted with through an off-chain runtime 8-101. On-chain operations may be listened for by a Listener 8-109. Updates/events received through a Listener may be used by an off-chain runtime to perform computation (e.g. as an input event), surfaced in a contract log/audit trail (see FIG. 13), used to update tasks in a task management function, to update a wallet interface of a CMS, or in another appropriate form.

An exemplary overview of one possible BDL implementation during runtime is depicted by FIG. 8. The BDL may be an account-based BDL system, "Unspent Transaction Output"-based system (UTXO), or any other form of BDL system. Multiple BDL systems may be used with an off-chain contract. A 'Call', and a 'Create' are examples of on-chain operations that may be performed (e.g. via API) 8-101. Parameters and other data may be passed to on-chain code from the off-chain contract 8-102 to perform the on-chain computation/transaction. For example, on-chain code may be instantiated upon execution/signature of the off-chain contract (e.g. by compilation or cross-compilation—8-103) or on-chain code may be an on-chain library of standardized operations, transactions, events etc. This script/on-chain code may later be called by the system. The transaction may be signed by the private key(s) of public-private key pair for a contracting party 8-104. In one embodiment, management of keys may be delegated to a key management module 8-105. The module may, in one embodiment, be an external service or resource or series or services/resources. Private keys may be generated per contract for each contracting party, or pre-existing keys may be utilized (e.g., from an external service or held by the system). A contracting party may initiate the signing of a transaction, or signing may be delegated to the key management module or other service. The signed transaction/operation is then sent to a local node 8-106 (any appropriate approach of doing so may be used, e.g. RPC). The local node may validate the transaction/operation for the BDL network. The transaction/operation is then propagated to the BDL network 8-107, executed by the runtime of the BDL system (e.g., a container or virtual machine), and may be finalized as a confirmed transaction within the BDL data structure 8-108. A module may be used to listen for on-chain operations, events, transactions, etc. 8-109. Data from the listener may be passed to the execution engine to update the state of the contract when a transaction is confirmed. The state of the legal contract may then be updated in the contract log or other state storage mechanism. Data storage for the contract log and/or the contract repositories 8-110 may take any suitable form (e.g., decentralized, distributed, centralized, cloud-based, on-premise, etc.). Additional or alternative components and interactions between components may be used. Additional and/or alternative steps may be used. Not all components depicted may be used in an implementation.

FIG. 24 provides a further exemplary embodiment of another implementation of a runtime comprising an off-chain and an on-chain runtime component 24-106. An off-chain runtime may be an execution engine, server, virtual machine, image/container, or any other suitable runtime environment that executes a contract in whole or part off-chain. An on-chain runtime may be a VM or other runtime of a BDL system for executing on-chain code. The off-chain component may communicate with the on-chain component (e.g., to pass messages to the VM of a BDL system) to perform on-chain script execution or any other on-chain operation. For example, a programmable component may execute off-chain, and perform an on-chain operation. Communication may be through any suitable communication or transport mechanism (e.g., RPC, API, etc.). In one variation, the VM may comprise a combination of a VM or node client of a BDL system and an off-chain execution runtime. The VM may itself form part of a client of a BDL system.

One or more on-chain objects (e.g. scripts) are instantiated upon formation of the contract or may exist as a library of on-chain scripts that may be called 24-101. An on-chain object may be compiled from higher level source code (e.g., it may exist as bytecode on-chain). An on-chain script may perform any arbitrary operation. An on-chain script may form part of a programmable clause or may be unrelated to a clause. The on-chain script is called by the off-chain contract runtime and a transaction payload is generated through which parameters (e.g. from the off-chain contract runtime based upon the state of the contract—such as the current price) may be passed to the on-chain script 24-102. The transaction is signed—either by the parties or the off-chain runtime on behalf of the parties (e.g. as the parties have delegated signing authority and keys to the runtime or a Signature Module) 24-103. The signed transaction may be submitted to the node of the BDL system (where separate) or to the on-chain runtime system to validate the correctness of the signature. The on-chain runtime broadcasts the signed transaction to the BDL network 24-104. Where a blockchain data structure is used, when a new block is generated containing the transaction, the BDL system runtime synchronizes its copy of the blockchain data structure including the updated state 24-105 caused by execution of the on-chain code based upon the state of the off-chain component 24-106.

3. Method

Figure 43:
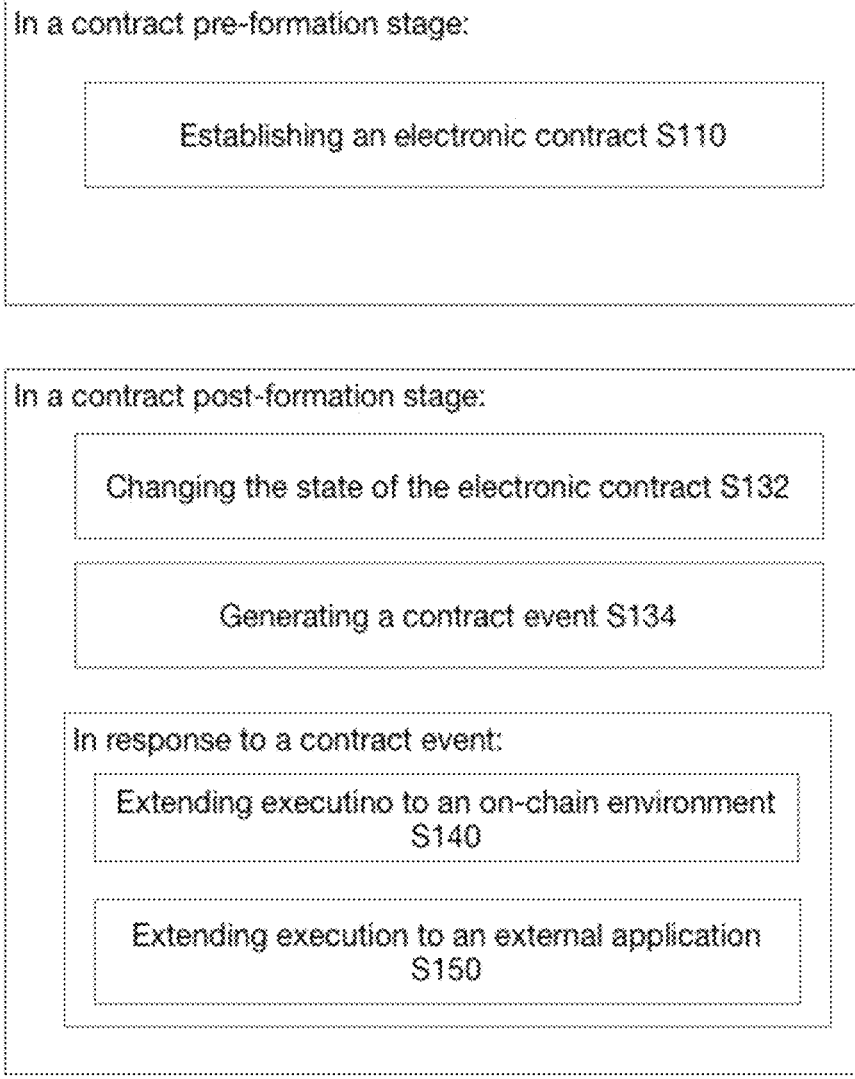
FIG. 43 is a flowchart of a method of a preferred embodiment.

As shown in FIG. 43, a method for managing an electronic contract, in a contract pre-formation stage, includes: establishing the electronic contract S110, wherein the electronic contract includes a set of executable programmable components and a set of natural language components; and in a contract post-formation stage, the method includes: changing the state of the electronic contract S132; generating a contract event S134, and in response to the contract event: extending execution of the electronic contract to an on-chain environment, when the contract event is associated with an on-chain integration S140; and extending execution of the electronic contract to an external application resource, when the contract even is associated with an external service integration S150. In a pre-formation stage, in some variations, the method may further include: forming a contract S120, comprising adding a plurality of participants S122 to the electronic contract; and adding at least one set of contract stipulations S124 to the electronic contract. In a post-formation stage, in some variations, the method may further include: updating the electronic contract S130. FIG. 44 shows one preferred variation with the additional steps. The method functions to manage an electronic contract and to enable a hybrid execution with contract events, resulting in on-chain and off-chain actions. Hybrid execution can enable execution of the electronic contract in a public environment (e.g. a public blockchain distributed ledger such as Ethereum), server-side actions, and/or through an external application resource (e.g. through an application programming interface). The method may be utilized with any appropriate system to establish, maintain, modify, and/or execute an electronic contract, and/or any other type of data-driven contract or document.

As a significant portion of this method pertains to on-chain and off-chain actions, these terms will be discussed here in detail. On-chain actions (e.g. contract execution) refer to types of actions taken on a blockchain and/or distributed ledger. Thus, on-chain or on-chain environment may refer to a blockchain, a distributed ledger, and any and/or all platforms related to distributed ledger technology (DLT). Consequently, on-chain or on-chain environment may be used to reference any combination of blockchain, DLTs, and/or computing environments similar to either blockchain or DLT. Unless explicitly stated otherwise, or stated in a specific implementation (e.g. a private blockchain server, Bitcoin, or Ethereum), the terms on-chain, on-chain environment, blockchain, distributed ledger, and BDL are used herein synonymously to refer to all technologies described by these terms. Dependent on implementation, these terms may refer to both internal and external BDL structures. In contrast, off-chain actions refer to any type of action that does not occur on a BDL; and off-chain or off-chain environment may refer to any non-BDL computing environment. Examples of possible off-chain platforms include: internal servers and external servers, public and private APIs, and/or any other non-BDL platform.

Hybrid actions refer to actions that occur both on-chain and off-chain. Generally speaking, a hybrid action only refers to where an action is taking place (i.e. both on-chain and off-chain). Unless stated, the very specifics of a hybrid action may not be identical on-chain and off-chain. For example, generating a contract both on- and off-chain may create an identical contract representation that is stored exactly in the same data structure both on- and off-chain, while executing the contract both on- and off-chain may execute different portions of the contract on-chain as compared to off-chain.

Block S110, which includes establishing the electronic contract S100, functions to create an electronically executable contract. Establishing the electronic contract S100 preferably occurs at the pre-formation stage of the contract; that is, prior to when the contract may be executed. The electronic contract is preferably comprised of a set of programmable components and a set of natural language components. Programmable components are preferably electronically executable logic components. In some variations, programmable components may take the form of programmable clauses as outlined in U.S. patent application Ser. No. 15/476,791, filed 31 Mar. 2017, which is hereby incorporated in its entirety by this reference. Programmable components may alternatively be other types of executable language components, such as tags, or scripts.

Establishing the electronic contract S100 preferably includes "gathering" the appropriate sets of components, both programmable components and natural language components to give the electronic contract a desired functionality and legality. Gathering the appropriate sets of components may include creating/writing components, obtaining the components from a database, modifying previously existing components, or through some other means. In some preferred variations, establishing an electronic contract S100 is accomplished in association with a contract management system (CMS). The CMS may enable gathering programmable components and natural language components that are standardized to electronic contracts (e.g. from a contract database) and may include specific functionalities of electronic contracts.

Additionally, the CMS may enable utilizing a template system for programmable components in establishing the electronic contract S100. The template system preferably functions as the template system as outlined in U.S. Patent Application No. 62/580,407, filed on 1 Nov. 2017, which is hereby incorporated in its entirety by this reference. The template system may function as a template system for programmable components enabling acquiring programmable component templates that can be instantiated, with the desired attributes, into the electronic contract.

Establishing the electronic contract Silo may further include generating a document entity. A document entity may function to define the scope of the current instance of the electronic contract. A document entity may be a word processed document (e.g., in ".doc" format, in Portable Document Format, HTML or other markup/markdown language, or any other appropriate format). Any suitable application may be used for establishing a document entity. The scope of the electronic contract may be identified by document identifying data within the document entity.

Document identifying data preferably comprises a document identifier. In a preferred embodiment, a document identifier is a unique reference to the electronic contract. The unique reference may take any suitable form. In one embodiment, this may take the form of a content-addressed identifier. A content-addressed identifier may be generated by applying a cryptographic hash function (e.g., SHA-256) to the electronic contract. Document identifying data may comprise one or more components. For example, document identifying data may include (in whole or in part), natural language components of the electronic contract; or the natural language components, model, and logic of the electronic contract. Additionally, an electronic contract may include identifiers for the individual programmable components instantiated within the document. For example, a programmable component representing a clause within an electronic contract may be referenced by its contents independently of the rest of the electronic contract. In such instances, the electronic contract may have a document level identifier and a separate identifiers for each of the programmable components instantiated within it.

In some variations, establishing the electronic contract S110 may further include establishing a mapping event. Establishing a mapping event functions to connect a potential contract event with an external application resource; thereby enabling an external application resource to execute the electronic contract (or a portion of the electronic contract) if/when the potential contract event occurs. Establishing a mapping event may be automated or may be implemented through consensus of the contract participants. Establishing a mapping event preferably includes mapping the potential contract event to the appropriate application protocol interface (API) call for the specific external application resource. For example, establishing a mapping event may set a date event (e.g. Mar. 1, 2019) for the purchase of a product (e.g. furniture) from an e-commerce store utilizing a specific external application resource (e.g. Stripe).

Block S120, which includes forming a contract S120, functions to complete and enable execution of the electronic contract. Forming a contract S120 preferably occurs at the pre-formation stage of the electronic contract and, if successful, changes the state of the electronic contract to the post-formation stage. Forming a contract S120 preferably includes adding a plurality of contract participants S122, and adding at least one set of contract terms to the electronic contract S124.

Adding a plurality of contract participants S122 is preferably a component of forming a contract S120. Adding a plurality of contract participants S122 functions in binding a plurality of contract parties to the contract, and to add any additional third parties to the contract.

Contract parties are preferably contract participants that will be bound by contract terms and obligations, as agreed upon by the contract participants through mutual assent. A single contract party may be an individual, group, or any other legal entity. In preferred variations, a contract party may be any entity, or group of entities, that can be legally bound as a party to a contract.

This parties can have different levels of participation with respect to the contract. Third parties can be contract participants that are not bound by the contract terms and obligations. Third parties may be purely observational participants that are not involved in a mutual assent decision pertaining to the contract. Alternatively, third parties may be the only members from the contract participants that are involved in a mutual assent decision pertaining to the contract.

In some variations, adding at least one set of contract stipulations to the electronic contract S124, is preferably a component of forming a contract S120. Adding at least one set of contract stipulations to the electronic contract S124 functions to give rise to a contractual obligation to the electronic contract. That is, each set of contract stipulations includes a set of conditions that must be met (or not met), and an associated obligation that must be carried out once the set of conditions have been met (herein referred to as meeting a set of contract stipulations). Adding at least one set of contract stipulations to the electronic contract S124 may add any number sets of contract stipulations as desired and agreed upon by the contract participants. Contract stipulations may be unilateral (i.e. obligations for a single party) or multilateral (i.e. obligations for more than a single party). Types of contract stipulations may vary depending on the type of the contract, laws pertaining to the contract, and desire of the contract participants. In some implementations, contract stipulations may include legally implied contract terms that are not explicitly stated in the contract (e.g. legal stipulations due to regional laws).

Adding at least one set of contract stipulations S124 may include adding contract stipulations as programmable components, as natural language components, or both. In some variations, programmable components may be automatically added to the electronic contract to account for implied contract stipulations or legal requirements, for example to follow regional licensing laws with certain types of transactions (e.g. house purchase).

Forming a contract S120 may further include signing the document. Signing the document may function to ensure mutual assent of the contract participants and to transition the contract into a post-formation stage. Signing the document may have multiple variations. In one variation, signing the document legally binds parties to the contract terms of the electronic contract. Prior to signing the document, editing the electronic contract is preferably restricted. Such a restriction may be enforced through whatever application generated the electronic contract (e.g. CMS). Editing restrictions may be in place for subsets of natural language components and/or the subsets of programmable components as desired in the implementation.

Signing the document may include using an electronic signature ("e-signature") service, cryptographic key pair (PKI), or other appropriate authentication method. In a preferred embodiment, signing the document includes using an e-signature service. The e-signature service is preferably integrated into a CMS, either as a component of the CMS or as an external service application as depicted in FIGS. 10 and 27.

In some variations, signing the document may include authentication/credential methods that may be used to control/condition contract execution across runtime environments. Credential methods may generate credentials that may then be checked through the logic of a programmable component. Examples of credential methods include: A counterparty or other entity signing a transaction under the control of another party; an asset/token being moved in a specific way (e.g. deposited on a multi-signature on-chain contract); and giving a contract participant certain attributes or permissions, such as giving the contract participant the authority to work in a certain jurisdiction, wherein the participant's state may be verifiable through a "Decentralized Identifier-based system" or other authentication system.

Block S130, which includes updating the electronic contract, functions to change the details of the electronic contract, as desired and/or stipulated, in the post-formation stage of the contract. In some variations, updating the electronic contract S130 includes changing the state of the electronic contract S132 and generating a contract event S134. In other preferred variations, blocks S132 and S134 may be independent of updating the electronic contract S130. Updating the electronic contract S130 preferably occurs whenever the electronic contract, or any subcomponent of the electronic contract, is changed. Updating the electronic contract S130 may occur to: change the contract participants; change a set of contract stipulations; update an instance of a programmable component (e.g. updating a transaction price, or a date); executing an automated component of the contract; executing a component of the contract, when a set of contract stipulations have been met, executing the entire contract, when a set of contract stipulations have been met; terminating the contract; or any other action that changes the electronic contract. Depending on the type of update, updating the electronic contract S130 may or may not require mutual assent of the contract participants (e.g. Adding a time-stamp may not require mutual assent, while adding participants to the contract may require mutual assent).

Block S132, which includes changing the state of the electronic contract S132 may function in creating a new instantiation of the electronic contract. In preferred variations, changing the state of the electronic contract S132 may be involved in creating an audit trail of the contract. In these variations, changing the state of the electronic contract S132 may include updating a contract log.

The contract log may be an append-only structure, wherein updating a contract log, includes adding the current contract state to the contract log. In an append only structure, the contract log preferably includes all current and prior states of the contract. Alternatively, the contract log may include only some prior states of the contract. In some variations, the contract log may be changed by contract participants (preferably by mutual assent). In other variations, the contract log is a "permanent" log of the contract and, as an append-only structure, only new contract states may be added to the contract log. In some variations, updating the contract log may also include updating the contract log not only in the post-formation stage but also in the pre-formation stage. In these variations, changes to the programmable components, natural language components, templates, and any other contract-related content and metadata may be added to the contract log. In some preferred variations, the rate and detail of creating an audit trail may be modified. For example, through a CMS or other application service, the frequency and type of updates that are recorded on to the contract log may be increased, modified, or decreased. In one specific market implementation, adding the current contract state to the contract log occurs only occurs only when the price/cost of a transaction changes, while otherwise the contract log stays unchanged regardless of other contract state changes.

The contract log may have any desired structure. In one preferred example, the contract log has a Merkle directed acyclic graph data structure. Updating the contract log then includes adding the current state of the contract as an object that is a new graph node with a Merkle root hash (i.e., the aggregate of all entries in the log). Objects added to the data structure may represent any data about the state of the contract. FIG. 38 provides an example in which two objects are added in each entry (e.g., an object referencing the log entry and an object referencing the party signatures for that object). The contract log object may include data relating to a task (e.g. an identifier) such as to associate the operation performed with the task pertaining to the operation. Metadata pertaining to an operation on an external application resource may be included in the object. For example, in the case of a payment executed through an API, transaction metadata as depicted by FIG. 15 may be contained in the object. FIG. 13 shows a sample "audit trail", i.e. a graphical representation of the contract log seen using a contract management system.

Block S134, generating a contract event S134 functions to create an object indicating that a contract related action should occur in the real world, e.g. a transaction. Typically, a contract event indicates an asymmetric contract related action (e.g. a payment for receiving goods). Contract events may be of any arbitrary type. For example, one type of contract event may be an "obligation"; an indication to perform or refrain from some action. Contract events may be interpreted as requests and responses. A contract event is demonstrated in one exemplary implementation in FIG. 26.

Generating a contract event S134 may occur in at least three different ways: Contract logic running off-chain may generate a contract event, contract logic running on-chain may generate a contract event, or contract logic running both on-chain and off-chain may generate a contract event. Contract logic running off-chain may be run from any server, virtual machine, container, or other appropriate runtime environment that is not executed on any type of blockchain distributed ledger (BLT). Generating a contract event S134 may generate a contract event on-chain (e.g., on an Ethereum BDL) or off-chain (e.g. private server database or private blockchain) as desired. In one preferred variation, generating a contract event includes storing the contract event on a task manager (on-chain or off-chain). In preferred variations, the contract event and contract event related data will also be stored in the contract log.

Other types of objects may be emitted by a runtime, not limited to event objects. Responses FIG. 26-105 and state objects FIG. 26-106 may also be used as non-limiting examples. Objects emitted from a runtime may be appended to a contract log, as well as used in external operations/actions as depicted in FIG. 26-108, or in any appropriate form. Additional and/or alternative objects may be used in variations.

Block S140, which includes extending execution of the electronic contract to an on-chain environment, functions to execute some, or all, of the electronic contract on a BDL in response to a contract event that is associated with an on-chain integration. As discussed previously, the BDL may be any desired blockchain, distributed ledger, and/or DLT technology. Extending execution of the electronic contract to an on-chain environment S140, may occur either through meeting a set of contract stipulations, wherein the set of contract stipulations include an associated on-chain integration; or in response to a contract event with an associated on-chain integration. The associated on-chain integration may be an internal on-chain integration (e.g. to a private server blockchain), or may be an external resource on-chain integration (e.g. public distributed ledger). Thus, the on-chain environment may be an internal and/or external BDL resource. Extending execution may include any actions stipulated by the contract, such as: creating, and/or updating a transaction.

For example, extending execution of an electronic contract to an on-chain environment S140 may include initiating a transaction on a blockchain when a set of BDL related contract stipulations are met. Once the set of BDL related contract stipulations are met, initiating a transaction on a blockchain includes applying the associated obligations (e.g. through programmable components), therein executing the electronic contract (or electronic contract components) on the BDL.

Block S150, which includes extending execution of the electronic contract to an external application resource, functions to execute some or all of the electronic contract through an external application resource in response to a contract event that is associated with an external service integration. Furthermore, block S150 preferably synchronizes involved transaction systems with the state of the electronic contract. Extending execution to an external application resource S150 preferably occurs via mapping an event to an external application resource, but may occur through other means. Mapping an event to an external application resource may occur either by a previously established contract event mapping, from the establishing a contract event mapping, in the contract pre-formation stage;

or by creating a contract event transformation. Contract event mappings may be implemented by other means as desired.

In one preferred variation, extending execution to an external application resource S150 comprises mapping an event to an external application resource. In this variation, block S150 occurs through a previously established potential contract event and the associated contract event mapping. Once a contract event occurs that matches the potential contract event, the associated contract event mapping may be utilized in extending execution to an external application resource S150. Necessary details of an external application resource, e.g. the type of execution, the time of execution, and all other details, are preferably previously defined in the pre-formation stage of the contract, during establishing the contract S100. As implied by the description, mapping an event to an external application resource may further occur in the contract pre-formation stage, but may occur at different times as desired.

In a second preferred variation, extending execution to an external application resource S150 occurs through the task manager. For contract events stored in the task manager, extending execution to an external application resource S150 further includes creating a contract event transformation. Creating a contract event transformation preferably includes creating the appropriate API call to execute a contract event action (or a contract event type action, e.g. a payment action) on a specific external application resource (e.g. PayPal). Creating a contract event transformation may occur anytime, both prior to or after generation of the coinciding contract event. That is, a potential contract event and the associated contract event transformation may be created and maintained in the task manager until a contract event that matches the potential contract event is generated (similar to pre-formation generated contract event mappings). Creating a contract event transformation may be utilized for any possible contract action or accessible external application resource, as desired and mutually assented to by the contract participants. Creating a contract event transformation is preferably implemented through a task manager (e.g., task manager GUI on any appropriate electronic device). Creating a contract event transformation may be implemented through some alternate resource as desired.

Extending execution to an external application resource S150 enables utilizing programmable components and/or programmable component functionality on an external application resource. Programmable components within electronic contracts preferably perform transactions, operations, events, or other actions on an external application resource. Examples of external application resources include: a CMS (contract management system), accounting systems, payment systems, blockchain/distributed ledger systems, payroll and employment systems, contract lifecycle management systems, ERP systems, CRM systems, or any other appropriate systems and/or applications.

The interface with an external application resource may be through an API integration, webhooks, or any other suitable mode of communication. The interface to an external application resource will preferably include the transmission of a digital communication to an external server. API integration can be used to establish programmatic integration with any suitable type of service such as a payment service, a data/analytics service, an IoT platform, shipment/delivery service, a communication/messaging service, and/or any suitable type of service.

Mapping an event to an external application resource may include generating a task (e.g. using a programmable component) based upon generating the associated contract event. A task may be of any arbitrary form including, but not limited to: operations requiring user input prior to execution (e.g. a payment requiring user approval) or a specific state change of a programmable component (e.g. a new state as exemplified in the penalty calculation of FIG. 26). For example, a contract event may be mapped to a connector to perform an operation on an external resource. FIG. 26 depicts a schematic of an exemplary mechanism for establishing and executing an electronic contract, including generating contract events and mapping to external application resources. The process of mapping a contract event to an action on an external application resource may take any appropriate form. In one variation, mapping a contract event to an on-chain script may include passing data (e.g. via API calls) to another on-chain script (or series of scripts) to generate a contract event on a BDL. Actions may be initiated via callbacks/API integrations from external systems such as e-signature services.

Generating a task may include generating a notification, queuing operations, or performing other arbitrary events/operations. The action of generating a task may be modified and observed through a task manager or similar component. In some variations, generating a task may be a user desired operation that occurs independent of contract events. Examples of such a scenario include generating a task for: a user notification, to enable contract management, or to provide an update to the computed state of a programmable component of the electronic contract. Generating a task to provide an update to the computed state may facilitate contract participants to use the computed state to perform operations, such as to approve of a payment prior to execution of the payment operation on an external payment gateway.

In a preferred embodiment, tasks are preferably exposed to a user through a graphical user interface for task management. Each task is preferably assigned a unique identifier. Tasks may be exposed to users with a scoped instance of a CMS such as within an organization. Task management may involve a variety of operations being performed with respect to a task or series of tasks; such as confirming an operation (e.g. a payment), or modifying an operation (e.g. changing values of a queued up operation such as a payment). FIG. 42A depicts an exemplary process of generating a task and managing the task by a user. Tasks may be configured for association with workflows.

Certain tasks may be linked to pre-configured workflows, such that a given task needs to fulfill the workflow requirements prior to the operation being initiated. In a first variation, the workflow may be initiated automatically upon generating a task, or may be initiated from the task management interface by a user. Upon generating a task, a task management component may match the type of contract event generated to an appropriate workflow based upon configured parameters (e.g. a payment event with a monetary amount within a defined range). The process of the workflow may be handled by a workflow engine. In one embodiment, the workflow engine may be an external application resource. FIG. 42C depicts an exemplary variation of generating and managing a task by filtering the workflow based upon a task management configuration.

In an alternate variation, the workflow may be initiated at the point of instantiation of the programmable component. That is, establishing the electronic contract S100 may further include initiating a workflow. FIG. 42B depicts an exemplary variation of generating and managing a task as a workflow by configuring a programmable component within the electronic contract. A user may select, from a task management interface, an appropriate process for the workflow to be initiated with respect to a given task. The process for the workflow may be triggered on an external application resource (e.g., through an API, webhook, or other appropriate interface).

The systems and methods of the embodiments can be embodied and/or implemented at least in part as a machine configured to receive a computer-readable medium storing computer-readable instructions. The instructions can be executed by computer-executable components integrated with the application, applet, host, server, virtual machine, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method implemented at one or more computing systems having one or more processors and one or more non-transitory storage media for managing an electronic contract through a hybrid runtime environment comprising:
    establishing and storing the electronic contract that includes a set of executable programmable components and a set of natural language components on at least one of the one or more non-transitory storage media;
    changing, by at least one of the one or more processors, a state of the electronic contract and generating, by the at least one processor, a contract event; and
    in response to the contract event:
        extending, by the at least one processor, execution of the electronic contract to an on-chain environment comprising a blockchain, wherein extending execution of the electronic contract to the on-chain environment comprises:
            determining whether the contract event is associated with an on-chain integration;
            responsive to determining that the contract event is associated with the on-chain integration, storing data relating to the contract event to the blockchain, and passing the data to on-chain code that is stored on the blockchain and configured to execute a transaction; and
            responsive to determining that the contract event is not associated with the on-chain integration, refraining from storing the data relating to the contract event to the blockchain; and
        extending execution of the electronic contract to an external application resource when the contract event is associated with an external service integration.

2. The method of claim 1, wherein the on-chain environment is a blockchain environment.

3. The method of claim 1, wherein the on-chain environment is a distributed ledger environment.

4. The method of claim 1, wherein changing the state of the electronic contract occurs when the electronic contract is modified.

5. The method of claim 1, wherein the electronic contract further comprises at least one set of contract stipulations and changing the state of the electronic contract occurs when a contract stipulation is met.

6. The method of claim 1, wherein generating the contract event comprises generating the contract event on a private server.

7. The method of claim 1, wherein generating the contract event comprises generating the contract event on the on-chain environment.

8. The method of claim 1, wherein extending execution of the electronic contract to the on-chain environment further comprises, responsive to determining that the contract event is associated with the on-chain integration, performing an operation on the blockchain.

9. The method of claim 8, wherein performing the operation on the blockchain comprises initiating the transaction on the blockchain.

10. The method of claim 1, wherein generating the contract event comprises appending the contract event to an audit log of the electronic contract.

11. The method of claim 10, wherein appending the contract event to the audit log of the electronic contract comprises storing the audit log on the blockchain.

12. The method of claim 1, wherein the external application resource is located on a public blockchain, distributed ledger network.

13. The method of claim 1, wherein the external application resource is located on a private server.

14. The method of claim 1, wherein extending execution of the electronic contract to the external application resource occurs through an application programming interface integration.

15. The method of claim 1, wherein extending execution of the electronic contract to the external application resource comprises mapping the contract event to the external application resource.

16. The method of claim 15, wherein mapping the contract event to the external application resource comprises mapping the contract event to the external application resource prior to executing the electronic contract.

17. The method of claim 1, further comprising, at a contract management system, during a pre-formation stage of the electronic contract, forming a contract, which comprises of adding a plurality of participants to the electronic contract, and adding at least one set of contract stipulations to the electronic contract.

18. The method of claim 1, wherein changing the state of the electronic contract and generating the contract event occur on-chain.

19. The method of claim 1, wherein changing the state of the electronic contract and generating the contract event occur off-chain.

20. The method of claim 1, wherein changing the state of the electronic contract and generating the contract event, occur both on the on-chain environment and an off-chain environment.

21. A system comprising memory with instructions encoded thereon and one or more processors that, when executing the instructions, are caused to perform operations, the system being for hybrid runtime execution of an electronic contract, the system comprising:
a contract execution service that comprises an internal runtime environment and a set of integrations to external resources with at least one integration to an on-chain runtime, wherein the contract execution service is configured to:
establish the electronic contract, wherein the electronic contract comprises a set of executable programmable components and a set of natural language components,
change a state of the electronic contract and generate a contract event, and
extend execution of the electronic contract to an on-chain environment comprising a blockchain, wherein, to extend execution of the electronic contract to the on-chain environment, the contract execution service is configured to:

determine whether the contract event is associated with an on-chain integration;
responsive to a determination that the contract event is associated with the on-chain integration, store data relating to the contract event to the blockchain, and pass the data to on-chain code that is stored on the blockchain configured to execute a transaction; and
responsive to a determination that the contract event is not associated with the on-chain integration, refrain from storing the data relating to the contract event to the blockchain; and
extend execution of the electronic contract to an external application resource when the contract event includes an associated external service integration.

* * * * *